United States Patent
Okada et al.

(10) Patent No.: US 6,519,410 B1
(45) Date of Patent: Feb. 11, 2003

(54) INFORMATION RECORDING MEDIUM, APPARATUS AND METHOD FOR RECORDING OR REPRODUCING THE RECORDING MEDIUM

(75) Inventors: Tomoyuki Okada, Katano (JP); Noriko Sugimoto, Takarazuka (JP); Kaoru Murase, Ikoma-gun (JP); Kazuhiro Tsuga, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/521,203

(22) Filed: Mar. 8, 2000

(30) Foreign Application Priority Data

Mar. 9, 1999 (JP) .............................. 11-061296

(51) Int. Cl.$^7$ ............................. H04N 7/00; H04N 5/91
(52) U.S. Cl. ........................................... 386/46; 386/83
(58) Field of Search ........................ 386/46, 124, 125, 386/126, 105, 106, 1, 83, 45, 52, 92, 4; H04N 7/00, 5/91

(56) References Cited

U.S. PATENT DOCUMENTS 5,502,573 A * 3/1996 Fujinami
5,963,382 A    10/1999 Abe

FOREIGN PATENT DOCUMENTS

| EP | 0546189 | 6/1993 |
|---|---|---|
| EP | 0551133 | 7/1993 |
| EP | 0651392 | 5/1995 |
| EP | 0855714 | 7/1998 |
| EP | 0877377 | 11/1998 |
| EP | 0 903 738 | 3/1999 |
| EP | 0 926 903 | 6/1999 |
| JP | 7-93873 | 4/1995 |
| JP | 7-312737 | 11/1995 |
| JP | 8-7282 | 1/1996 |
| JP | 8-31106 | 2/1996 |
| JP | 8-147944 | 6/1996 |
| JP | 9-106659 | 4/1997 |
| JP | 9-198803 | 7/1997 |
| JP | 10-32783 | 3/1998 |
| JP | 10-164506 | 6/1998 |
| JP | 10-208408 | 8/1998 |
| JP | 10-290420 | 10/1998 |
| WO | 95/34071 | 12/1995 |

* cited by examiner

Primary Examiner—Robert Chevalier
(74) Attorney, Agent, or Firm—Wenderoth, Lind & Ponack, L.L.P.

(57) ABSTRACT

The present invention provides an information recording medium suitable for an optical disc such as DVD, which is capable of reading quickly the recording time information of the video data for displaying on the menu. The recording medium stores management information (RTR.IFO) for each stream data. The management information includes a recording time information (VOB_REC_TM) that has a date and time at which the head video frame of the stream data is recorded. The management information also has an error information (VOB_REC_TM_SUB) indicative of error or fraction of the recording time information which indicates a time less than 1 second and is generated on edit operations including partial deletion.

16 Claims, 49 Drawing Sheets

Fig.7

| VERN | | | | | | | | |
|---|---|---|---|---|---|---|---|---|
| b15 | b14 | b13 | b12 | b11 | b10 | b9 | b8 | |
| | | | reserved | | | | | |
| b7 | b6 | b5 | b4 | b3 | b2 | b1 | b0 | |
| | | | Book version | | | | | |

| TM_ZONE | | | | | | | | |
|---|---|---|---|---|---|---|---|---|
| b15 | b14 | b13 | b12 | b11 | b10 | b9 | b8 | |
| | TZ_TY | | | | TZ_OFFSET[11..8] | | | |
| b7 | b6 | b5 | b4 | b3 | b2 | b1 | b0 | |
| | | | TZ_OFFSET[7..0] | | | | | |

Fig.9

| PL_TY | | | | | | | |
|---|---|---|---|---|---|---|---|
| b7 | b6 | b5 | b4 | b3 | b2 | b1 | b0 |
| PL_TY1 | | | | reserved | | | |

| PL_CREATE_TM | | | | | | | |
|---|---|---|---|---|---|---|---|
| b39 | b38 | b37 | b36 | b35 | b34 | b33 | b32 |
| Year[13..6] | | | | | | | |
| b31 | b30 | b29 | b28 | b27 | b26 | b25 | b24 |
| | | Year[5..0] | | | | Month[3..2] | |
| b23 | b22 | b21 | b20 | b19 | b18 | b17 | b16 |
| Month[1..0] | | | | Day[4..0] | | | |
| b15 | b14 | b13 | b12 | b11 | b10 | b9 | b8 |
| Hour[3.0] | | | | | Minute[5..2] | | |
| b7 | b6 | b5 | b4 | b3 | b2 | b1 | b0 |
| Minute[1..0] | | | Second[5..0] | | | | |

Fig.10

PTM describing format

| b47 | b46 | b45 | b44 | b43 | b42 | b41 | b41 |
|-----|-----|-----|-----|-----|-----|-----|-----|
| | | | PTM_base[31..24] | | | | |

| b39 | b38 | b37 | b36 | b35 | b34 | b33 | b32 |
|-----|-----|-----|-----|-----|-----|-----|-----|
| | | | PTM_base[23..16] | | | | |

| b31 | b30 | b29 | b28 | b27 | b26 | b25 | b24 |
|-----|-----|-----|-----|-----|-----|-----|-----|
| | | | PTM_base[15..8] | | | | |

| b23 | b22 | b21 | b20 | b19 | b18 | b17 | b16 |
|-----|-----|-----|-----|-----|-----|-----|-----|
| | | | PTM_base [7..0] | | | | |

| b15 | b14 | b13 | b12 | b11 | b10 | b9 | b8 |
|-----|-----|-----|-----|-----|-----|-----|-----|
| | | | PTM_extension[15..8] | | | | |

| b7 | b6 | b5 | b4 | b3 | b2 | b1 | b0 |
|----|----|----|----|----|----|----|----|
| | | | PTM_extension [7..0] | | | | |

Fig.11

| S_VOB_ENTN describing format | | | | | | |
|---|---|---|---|---|---|---|
| b47 | b46 | b45 | b44 | b43 | b42 | b41 |
| | | | S_VOB_ENTN | | | b41 |
| b39 | b38 | b37 | b36 | b35 | b34 | b33 | b32 |
| b31 | b30 | b29 | reserved | | b26 | b25 | b24 |
| b23 | b22 | b21 | b20 | reserved | b18 | b17 | b16 |
| b15 | b14 | b13 | b12 | b11 | b10 | b9 | b8 |
| b7 | b6 | b5 | b4 | b3 | b2 | b1 | b0 |
| | | | reserved | | | |

Fig. 13

V_ATR

| b15 | b14 | b13 | b12 | b11 | b10 | b9 | b8 |
|---|---|---|---|---|---|---|---|
| Video compression mode | | TV system | | | Aspect ratio | | |

| b7 | b6 | b5 | b4 | b3 | b2 | b1 | b0 |
|---|---|---|---|---|---|---|---|
| line21_switch_1 | line21_switch_2 | Video resolution | | | reserved | | |

A_ATR0/1

| b23 | b22 | b21 | b20 | b19 | b18 | b17 | b16 |
|---|---|---|---|---|---|---|---|
| Audio coding mode | | | reserved | | | Application Flag | |

| b15 | b14 | b13 | b12 | b11 | b10 | b9 | b8 |
|---|---|---|---|---|---|---|---|
| Quantization/DRC | | fs | | Number of Audio channels | | | |

| b7 | b6 | b5 | b4 | b3 | b2 | b1 | b0 |
|---|---|---|---|---|---|---|---|
| Bitrate | | | | | | | |

Fig. 14

SP_ATR

| b15 | b14 | b13 | b12 | b11 | b10 | b9 | b8 |
|---|---|---|---|---|---|---|---|
| reserved | | | | | | | Application Flag |
| b7 | b6 | b5 | b4 | b3 | b2 | b1 | b0 |
| reserved | | | | | | | |

SP_PLT

| b23 | b22 | b21 | b20 | b19 | b18 | b17 | b16 |
|---|---|---|---|---|---|---|---|
| b15 | b14 | b13 | b12 | b11 | b10 | b9 | b8 |
| Luminance signal (Y) | | | | | | | |
| Color difference signal (Cr=R−Y) | | | | | | | |
| b7 | b6 | b5 | b4 | b3 | b2 | b1 | b0 |
| Color difference signal (Cb=B−Y) | | | | | | | |

Fig. 17

| VOB_TY | | | | | | | | | | | | | | | | |
|---|---|---|---|---|---|---|---|---|---|---|---|---|---|---|---|---|
| b15 | b14 | b13 | b12 | b11 | b10 | b9 | b8 | | | | | | | | | |
| TE | A0_STATUS | | A1_STATUS | | reserved | APS | | | | | | | | | | |
| b7 | b6 | b5 | b4 | b3 | b2 | b1 | b0 | | | | | | | | | |
| SML_FLG | A0_GAP_LOC | | A1_GAP_LOC | | reserved | | | | | | | | | | | |

Fig.19

| VOBU_ENT | | | | | | | |
|---|---|---|---|---|---|---|---|
| b23 | b22 | b21 | b20 | b19 | b18 | b17 | b16 |
| b15 | b14 | b13 | b12 | b11 | b10 | b9 | b8 |
| | | | 1STREF_SZ | | | | |
| b7 | b6 | b5 | b4 | b3 | b2 | b1 | b0 |
| | | | VOBU_PB_TM | | | VOBU_SZ(upper) | |
| | | | VOBU_SZ(lower) | | | | |

Fig.21

V_ATR

| b15 | b14 | b13 | b12 | b11 | b10 | b9 | b8 |
|---|---|---|---|---|---|---|---|
| Video compression mode | | TV system | | Aspect ratio | | reserved | |
| b7 | b6 | b5 | b4 | b3 | b2 | b1 | b0 |
| reserved | | Video resolution | | | reserved | | |

OA_ATR

| b15 | b14 | b13 | b12 | b11 | b10 | b9 | b8 |
|---|---|---|---|---|---|---|---|
| Audio coding mode | | reserved | | | | Application Flag | |
| b7 | b6 | b5 | b4 | b3 | b2 | b1 | b0 |
| Quan./DRC | | fs | | Number of Audio channels | | | |

Fig.22

SP_ATR

| b15 | b14 | b13 | b12 | b11 | b10 | b9 | b8 |
|---|---|---|---|---|---|---|---|
| | | | reserved | | | Application Flag | |
| b7 | b6 | b5 | b4 | b3 | b2 | b1 | b0 |
| | | | reserved | | | | |

SP_PLT

| b23 | b22 | b21 | b20 | b19 | b18 | b17 | b16 |
|---|---|---|---|---|---|---|---|
| | | | Luminance signal (Y) | | | | |
| b15 | b14 | b13 | b12 | b11 | b10 | b9 | b8 |
| | | | Color difference signal (Cr=R−Y) | | | | |
| b7 | b6 | b5 | b4 | b3 | b2 | b1 | b0 |
| | | | Color difference signal (Cb=B−Y) | | | | |

Fig.24

| S_VOB_ENT (TYPE A) 2bytes | |
|---|---|
| S_VOB_ENT_TY | 1byte |
| V_PART_SZ | 1byte |

| S_VOB_ENT (TYPE B) 6bytes | |
|---|---|
| S_VOB_ENT_TY | 1byte |
| V_PART_SZ | 1byte |
| A_PART_SZ | 2bytes |
| A_PB_TM | 2bytes |

Fig.25

| S_VOB_ENT_TY | | | | | | | |
|---|---|---|---|---|---|---|---|
| b7 | b6 | b5 | b4 | b3 | b2 | b1 | b0 |
| MAP_TY | | TE | reserved | | | | SPST_Ns |

Fig.29

| PG_TY | | | | | | | | |
|---|---|---|---|---|---|---|---|---|
| b7 | b6 | b5 | b4 | b3 | b2 | b1 | b0 | |
| Protect | reserved | | | | | | | |

Fig.31

| C_TY | b7 | b6 | b5 | b4 | b3 | b2 | b1 | b0 |
|---|---|---|---|---|---|---|---|---|
| | C_TY1 | | | reserved | | | | |

Fig.32

| M_C_EPI(Type A) | 7bytes |
|---|---|
| EP_TY | 1byte |
| EP_PTM | 6bytes |

| M_C_EPI(Type B) | 135bytes |
|---|---|
| EP_TY | 1byte |
| EP_PTM | 6bytes |
| PRM_TXTI | 128bytes |

| S_C_EPI(Type A) | 7bytes |
|---|---|
| EP_TY | 1byte |
| S_VOB_ENTN | 6bytes |

| S_C_EPI(Type B) | 135bytes |
|---|---|
| EP_TY | 1byte |
| S_VOB_ENTN | 6bytes |
| PRM_TXTI | 128bytes |

Fig.33

| EP_TY1 | | | | | | | EP_TY1 |
|---|---|---|---|---|---|---|---|
| b7 | b6 | b5 | b4 | b3 | b2 | b1 | b0 |
| | | reserved | | | | | |

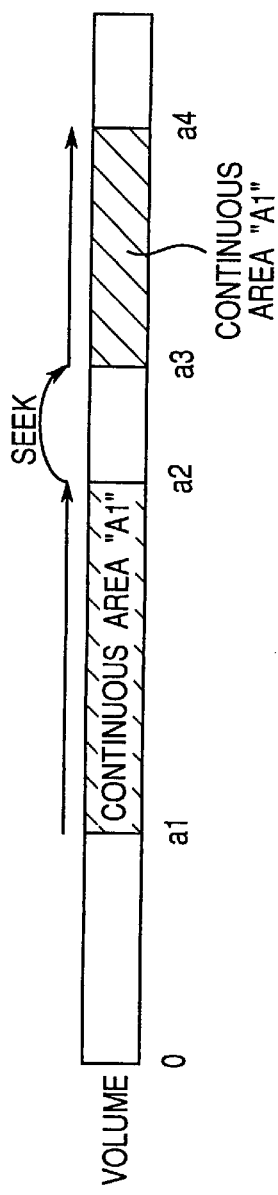
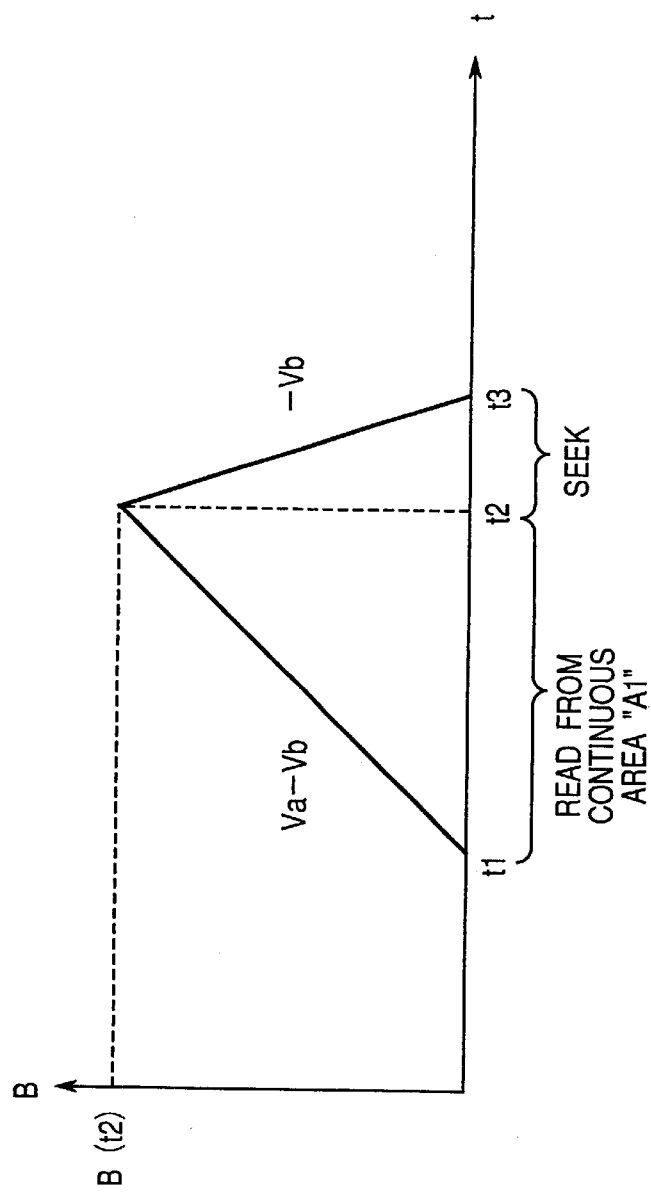
Fig.35A
Fig.35B

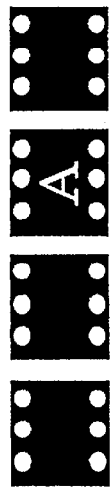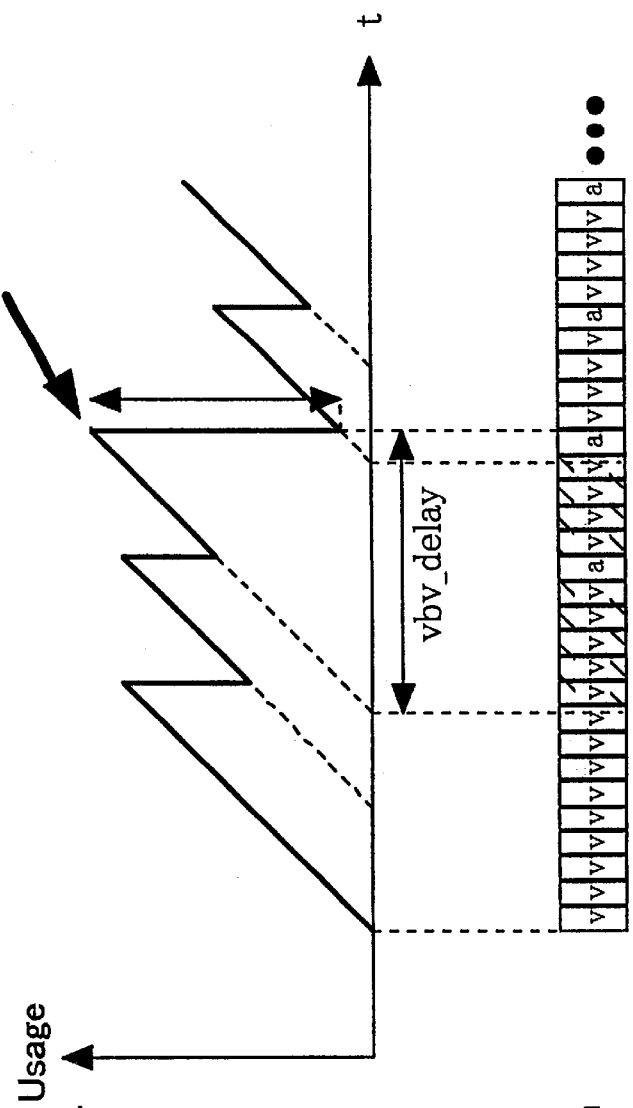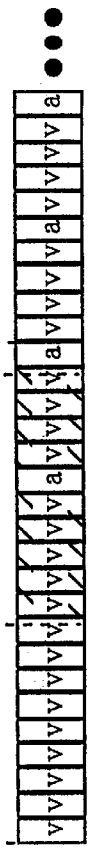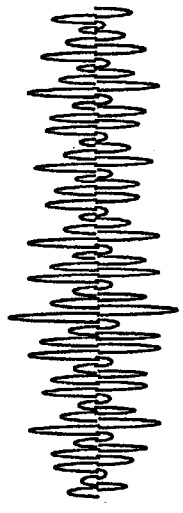
Fig.39A Video
Fig.39B Video Buffer
Fig.39C MPEG Stream
Fig.39D Audio
Prior Art

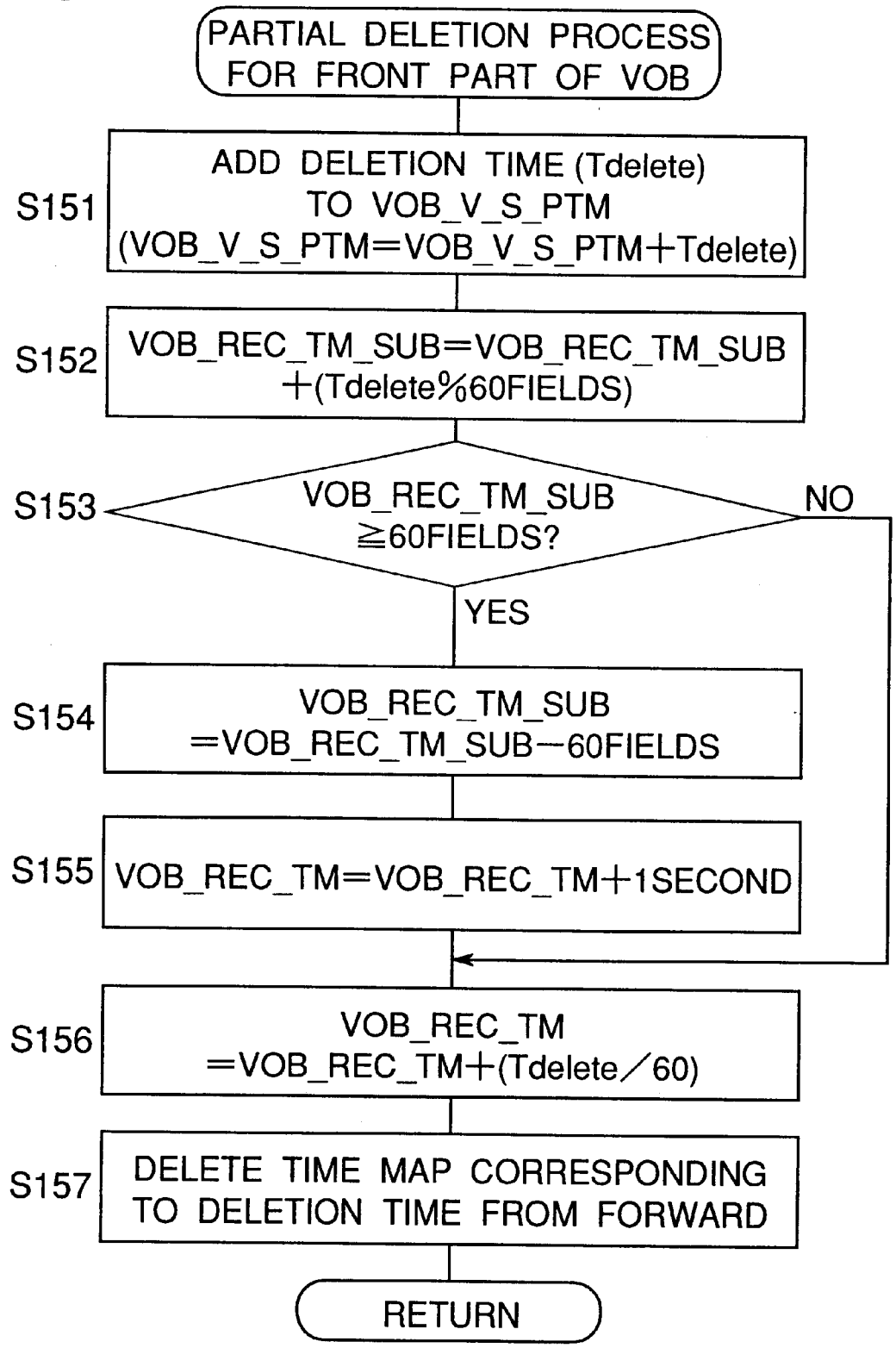

INFORMATION RECORDING MEDIUM, APPARATUS AND METHOD FOR RECORDING OR REPRODUCING THE RECORDING MEDIUM

BACKGROUND OF THE INVENTION

1. Field of the Invention

The present invention relates to an information recording medium like an optical disc capable of being read/written thereto, and more particularly to a recording medium in which multimedia data including movie data are stored, an apparatus and a method for recording or reproducing the medium.

2. Related Art

In the field of a writable optical disc having an upper bound of approximately 650 MB, a phase change type disc DVD-RAM having a capacity of several GB has appeared. Moreover, in addition to the practical use of MPEG (MPEG2) which is the coding standard of digital AV data, the DVD-RAM has been expected as recording and reproducing media in the AV field as well as computer application. In other words, it is expected that the DVD-RAM will spread as media in place of a magnetic tape which is conventionally typical AV recording media.

(Description of DVD-RAM)

In recent years, an enhancement in the density of a writable optical disc has been developed so that it has been possible to record video data as well as computer data and audio data.

For example, a convexo-concavo shaped guide groove has conventionally been formed on the signal recording face of the optical disc. While a signal has conventionally been recorded on only a land portion or a groove portion, it has become possible to record the signal on both the land and groove portions by a land-groove recording method. Consequently, a recording density has been enhanced by approximate twice as much (see Japanese Patent Laid-Open Publication No, 8-7282, for example). Moreover, there has also been devised and practically used a zone CLV method or the like in which the control of a CLV method (constant linear velocity recording) effective in an enhancement in the recording density can be simplified and easily used practically (see Japanese Patent Laid-Open Publication No. 7-93873, for example).

A great problems in the future are how to record AV data including video data using an optical disc intended to have an increase in a capacity, and how to implement performance greatly exceeding a conventional AV apparatus and new functions.

By the appearance of such a writable optical disc having a large capacity, it can be supposed that an optical disc becomes a mainstream also for AV recording and reproduction in place of a conventional tape. The conversion of recording media from the tape into the disc has various influences on the function and performance of an AV apparatus. The conversion into the disc has the greatest feature that random access performance is considerably enhanced. If the tape is subjected to random access, it is necessary to usually take a time in order of several minutes for one rewinding. This is extraordinarily late as compared with a seek time (20–60 ms or less) on the optical disc media. Accordingly, the tape cannot act as a random access device in respect of practical use. By such random access performance, the distributed recording operation of the AV data which could not be performed by the conventional tape can be implemented by the optical disc.

FIG. 34 is a block diagram showing a drive device of a DVD recorder. In the drawing, the reference numeral 11 denotes a optical pick-up for reading the data of a disc, the reference numeral 12 denotes an ECC (error correcting code) processing section, the reference numeral 13 denotes a track buffer, the reference numeral 14 denotes a switch for switching the input and output to and from the track buffer, the reference numeral 15 denotes an encoder, and the reference numeral 16 denotes a decoder. The reference numeral 17 denotes an enlarged part of the disc.

As shown by the reference numeral 17, data are recorded on the DVD-RAM disc with 1 sector=2 KB as a minimum unit. Moreover, an error correcting processing is executed by the ECC processing section 12 with 16 sectors=1 ECC block.

The track buffer shown by the reference numeral 13 serves to record the AV data with a variable bit rate in order to record the AV data on the DVD-RAM disc more efficiently. While a read/write rate (Va in the drawing) from/to the DVD-RAM is a fixed rate, the AV data change a bit rate (Vb in the drawing) according to the complexity of the contents thereof (a video image, for example). The track buffer 13 serves to absorb a difference in the bit rate. For example, this is not required if the AV data is set to the fixed bit rate as in a video CD.

By utilizing the track buffer 13 still effectively, the AV data can be discretely provided on the disc. Description will be given with reference to FIG. 35.

FIG. 35A is a diagram showing an address space on a disc. In the case where the AV data are separately recorded in a continuous region of [a1, a2] and a continuous region of [a3, a4] as shown in FIG. 35A, the AV data can be continuously reproduced by supplying data stored in the track buffer 13 to the decoder 16 while a seek is being carried out from a2 to a3. A status obtained at this time is shown in FIG. 35B.

The AV data read from a1 are input to the track buffer 13 and output from the track buffer 13 at a time t1, and the data are stored in the track buffer 13 by a rate difference (Va−Vb) between an input rate (Va) to the track buffer 13 and an output rate (Vb) from the track buffer 13. This state continues up to a2 (time t2). When an amount of data stored in the track buffer 13 for this period of time is represented by B (t2), It is sufficient that amount B (t2) stored in the track buffer 13 can be consumed to continuously supplied to the decoder 16 till a time t3 corresponding to data reading start point of a3.

In other words, if a constant amount of data ([a1, a2]) to be read before the seek or more are kept, the AV data can be continuously supplied even if the seek is generated.

In the above example the description is given to the case where the data are read from the DVD-RAM (that is, playback), however the case where the data is written to the DVD-RAM (that is, picture recording) may be considered similarly.

If the constant amount or more of data are continuously recorded on the DVD-RAM as described above, continuous reproduction/picture recording can be carried out even if the AV data are distributed and recorded on the disc.

(Description of MPEG)

Next, description will be given to the AV data.

As described earlier, the AV data to be recorded on the DVD-RAM use an international standard referred to as MPEG (ISO/IEC13818).

Even a DVD-RAM having a large capacity of several GBs does not always have a sufficient capacity for exactly recording non-compressed digital AV data. Therefore, a method for compressing and recording the AV data is required. As a method for compressing the AV data, the MPEG (ISO/IEC13818) has widely spread in the world. In recent years, the LSI technology has been improved so that MPEG codec (expansion/compression LSI) has been put into practical use. Consequently, the DVD recorder can implement MPEG expansion/compression.

The MPEG mainly has the following two features in order to implement highly efficient data compression.

A first feature is that a compressing method using a time correlation characteristic between frames is introduced in addition to a compressing method using a space frequency characteristic which has conventionally been carried out in the compression of the motion picture data. In the MPEG, each frame (which will be also referred to as a picture in the MPEG) is classified into three kinds of parts, that is, an I picture (intra-frame coding picture), a P picture (a picture using the intra-frame coding and a reference relationship in the past) and a B picture (a picture using the intra-frame coding and reference relationships in the past and future), thereby performing data compression.

FIG. 36 is a diagram showing a relationship among the I, P and B pictures. As shown in FIG. 36, the P picture refers to the last I or P picture in the past, and the B picture refers to the closest I or P picture in the past and future. As shown in FIG. 36, moreover, since the B picture refers to the I or P picture in the future, the display order (display order) of each picture and the order (coding order) on the compressed data may be coincident with each other.

A second feature of the MPEG is that coding amount can be assigned dynamically for each picture in accordance with the complexity of the picture. The decoder of the MPEG comprises an input buffer. The decoder can assign a large coding amount to a complex picture which is hard to compress by storing data in the decoder buffer in advance.

Audio data used by the DVD-RAM can be selected for use from three kinds of parts, that is, MPEG audio for carrying out data compression, Dolby digital (AC-3) and non-compressed LPCM. While the Dolby digital and the LPCM have a fixed bit rate, the MPEG audio has a variable bit rate and has a size which is not as great as the size of a video stream but can be selected from plural kinds of sizes in an audio frame unit.

Such AV data are multiplexed into one stream by a method referred to as an MPEG system. FIG. 37 is a diagram showing the structure of the MPEG system. The reference numeral 41 denotes a pack header, the reference numeral 42 denotes a packet header, and the reference numeral 43 denotes a payload. The MPEG system has a hierarchical structure which is referred to as a pack and a packet. The packet comprises the packet header 42 and the payload 43. The AV data are divided per proper size from the head, and are stored in the payload 43. The packet header 42 stores ID (stream ID) for identifying stored data, a decoding time DTS (Decoding Time Stamp) of data (the DTS is omitted if the decoding and the display are carried out at the same time as in the audio data) and a presentation time PTS (Presentation Time Stamp) of the data which are included in the payload represented with a precision of 90 kHz are recorded, as information related to AV data stored in the payload 43. The pack is a unit having a plurality of packets together. In case of the DVD-RAM, one pack is used every packet. Therefore, the pack comprises the pack header 41 and the packet (the packet header 42 and the payload 43). The pack header stores SCR (System Clock Reference) representing with a precision of 27 MHz a time that data in the pack are input to the decoder buffer.

In the DVD-RAM, such an MPEG system stream is recorded by using one pack as one sector (=2048 B).

Next, description will be given to a decoder for decoding the above-mentioned MPEG system stream. FIG. 38 shows a decoder model (P-STD) of the MPEG system decoder. The reference numeral 51 denotes an STC (System Time Clock) acting as a reference time in the decoder. The reference numeral 52 denotes a demultiplexer for decoding or demultiplexing a system stream. The reference numeral 53 denotes an input buffer of a video decoder. The reference numeral 54 denotes a video decoder. The reference numeral 55 denotes a reorder buffer for temporarily storing the I and P pictures to absorb a difference between the data order and the display order which is made between the I and P pictures and the B picture as described above. The reference numeral 56 denotes a switch for adjusting the order of the outputs of the I and P pictures stored in the reorder buffer and the B picture. The reference numeral 57 denotes an input buffer of an audio decoder. The reference numeral 58 denotes an audio decoder.

Such an MPEG system decoder serves to process the above-mentioned MPEG system stream in the following manner. At a time that the time of the STC 51 is coincident with the SCR described in the pack header, the demultiplexer 52 inputs the same pack. The demultiplexer 52 serves to interpret a stream ID in the packet header and to transfer the data of the payload to the decoder buffer for each stream. Moreover, the demultiplexer 52 fetches the PTS and the DTS in the packet header. The video decoder 54 fetches picture data from the video buffer 53 at a time that the time of the STC 51 is coincident with the DTS to carry out a decode processing, and stores the I and P pictures in the reorder buffer 55 and displays the B picture. While the I and P pictures are decoded by the video decoder 54, the switch 56 is connected to the reorder buffer 55 to output a previous I or P picture in the reorder buffer 55. While the B picture is decoded, the switch 56 is connected to the video decoder 54. The audio decoder 58 fetches and decodes data for one audio frame from the audio buffer 57 at a time that the time of the STC 51 and the PTS (there is no DTS in cast of audio) are coincident with each other in the same manner as the video decoder 54.

Next, description will be given to a method for multiplexing the MPEG system stream with reference to FIGS. 39A–39D. FIG. 39A shows a video frame, FIG. 39B shows a status in the video buffer, FIG. 39C shows the MPEG system stream, and FIG. 39D shows audio data. An axis of abscissa indicates a time base which is common to each drawing, and each drawing is represented on the same time base. As shown in FIG. 39B, moreover, an axis of ordinate indicates a buffer usage (the data storage amount of the video buffer), and a thick line in the drawing indicates a transition of the buffer usage on a time basis. Furthermore, the gradient of the thick line is equivalent to the bit rate of the video, and indicates that data are input to the buffer at a constant rate. A reduction in the buffer usage at a constant interval indicates that the data are decoded. Besides, the intersection of an oblique dotted line and the time basis indicates a time that the data transfer of the video frame to the video buffer is started.

Hereinafter, a complex image A in the video data will be described as an example. Since an image A requires a large coding amount as shown in FIG. 39B, the data transfer to the video buffer should be started at a time t1 in the drawing in place of the decoding time of the image A. (A time from the data input start time t1 till the decoding will be referred to as vbv_delay). As a result, the AV data are multiplexed in the position (time) of the video pack shown in an oblique line. On the other hand, the transfer of the audio data which does not require dynamic coding amount control differently from the video data does not need to be particularly made earlier than the decode time. For this reason, generally, the multiplexing is carried out a little before the decode time. Accordingly, the video data and the audio data which are reproduced at the same time are multiplexed in the state in which the video data are preceded. In the MPEG, a time that data can be stored in the buffer is restricted, and all the data but still picture data are defined such that they should be output from the buffer to the decoder within one second after they are input to the buffer. For this reason, a shift of the multiplexing of the video data and the audio data is one second at the maximum (strictly speaking, there is a further shift by the reorder of the video data).

While the video has been followed by the audio in this example, the audio can also be followed by the video in respect of theory. When a simple picture having a high compression ratio is prepared for the video data and the audio data are transferred unnecessary quickly, such data can be created intentionally. However, the precedence can be given within one second at the maximum based on the restrictions of the MPEG.

(Description of Tape Media)

Next, description will be given to tape media.

FIG. 40 is a diagram illustrating a tape which has conventionally been used widely for AV recording.

Roughly speaking, the recording band of each data is assigned to a tape horizontally with respect to a running direction thereof, and the tape is constituted by a video recording band, an audio recording band and a time code recording band. In the time code recording band is recorded a recording date corresponding to each video frame recorded in the image recording band. By displaying the time code information together with corresponding image information, a user can know what time an image which is being seen was recorded.

The present invention solves the following problems which hinder the performance of the DVD-RAM expected as the AV recording media in the next generation described in the prior art from being brought out at the maximum, and implements a DVD recorder which is the greatest and favorite use of a large capacity optical disc DVD-RAM which is writable.

The maximum feature of the DVD recorder is random access performance in which high-speed access to a location desired by a user that cannot be implemented by the conventional tape media can be given.

A menu is used to draw effectively the random access performance. FIG. 41 shows an example of a menu display in the DVD recorder. The DVD recorder displays a list of program information recorded in the DVD-RAM. When the user selects a program on the menu, the DVD recorder seeks AV data for the selected program and starts to reproduce it.

Recording date and time information shown in FIG. 41 is essential information to the menu. For example, in a disc storing a dram series, the user can view programs in order of picture recording with reference to a recording date and time.

It takes several hundreds milliseconds for one-time seek on a random access operation. The speed of the random access is not enough to repeat a seek to each program to fetch the recording time and date information to be displayed on the menu. For example, in the case where 100 programs are recorded in the DVD-RAM to take a time of 500 milliseconds for the seek of each program, a time of 50 seconds (=100×500 milliseconds) are required to collect recording date and time information about all the programs.

More specifically, after the user inserts the DVD-RAM into the DVD recorder to wait for 50 seconds, a menu screen is first displayed. Thus, it is hard to say that the random access function which is the greatest feature of the DVD recorder can be utilized effectively.

SUMMARY OF THE INVENTION

To solve the above problems, this invention provides information recording medium suitable for an optical disc such as DVD, which actualize high speed reading operation of recording date and time information for stored AV data. The invention also provides an apparatus and method for recording or reproducing data on the recording medium.

In a first aspect of the invention, a recording medium is provided. The recording medium comprises video data and management information including a recording time information indicative of date and time at which the video data is recorded. In the recording medium, the recording time information may comprises a main time information including information of recording date and time of the video data represented by year, month, day, hour, minute and second, and an error time information including fraction time of the recording date and time of the video data that is less than one second.

In a second aspect of the invention, an apparatus for recording data onto the recording medium is provided. The apparatus comprises a receiving unit for receiving a request to delete a part of video data from user; and an updating unit for updating the recording time information when the part of video data is deleted in accordance with the received request.

In a third aspect of the invention, an apparatus is provided for reproducing data from the recording medium. The apparatus comprises a calculation unit for calculating a recording time to be displayed by adding elapsed time passed from a head of the video data to the recording time information of the video data during data reproducing operation and a synthesizing unit for synthesizing the calculated recording date and time information and the video data.

In a fourth aspect of the invention, a method is provided for recording data onto the recording medium. The method comprises receiving a request to delete a part of video data from user; and updating the recording time information when the part of video data is deleted in accordance with the received request.

In a fifth aspect of the invention, a method for reproducing data from the recording medium. The method comprises calculating a recording time to be displayed by adding elapsed time passed from a head of the video data to the recording time information of the video data during data reproducing operation and synthesizing the calculated recording date and time information and the video data.

(Related Reference)

It should be noted that this application is based on application No. 11-061296 filed in Japan, the contents of which is herein incorporated by reference.

BRIEF DESCRIPTION OF THE DRAWINGS

FIG. 7 is a diagram illustrating VERN and TM_ZONE formats.

FIG. 9 is a diagram illustrating PL_TY and PL_CREATE formats.

FIG. 10 is a diagram illustrating a PTM recording format.

FIG. 11 is a diagram illustrating an S_VOB_ENTN recording format.

FIG. 13 is a diagram illustrating VATR and A_ATR formats.

FIG. 14 is a diagram illustrating SP_ATR and SP_PLT formats for a motion picture.

FIG. 17 is a diagram illustrating a VOB_TY format.

FIG. 19 is a diagram illustrating a VOBU_ENT format.

FIG. 21 is a diagram illustrating V_ATR and OA_ATR formats.

FIG. 22 is a diagram illustrating SP_ATR and SP_PLT formats for a still picture.

FIG. 24 is a diagram showing the structure of S_VOB_ENT.

FIG. 25 is a diagram illustrating an S_VOB_ENT_TY format.

FIG. 29 is a diagram illustrating a PG_TY format.

Figure 31:
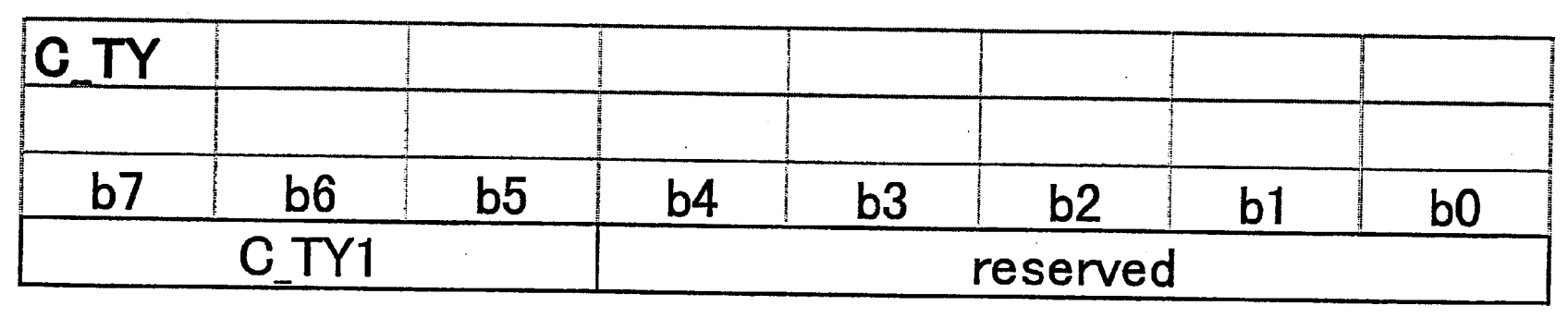

FIG. 31 is a diagram illustrating a C_TY format.

FIG. 32 is a diagram showing the structure of C_EPI.

Figure 33:
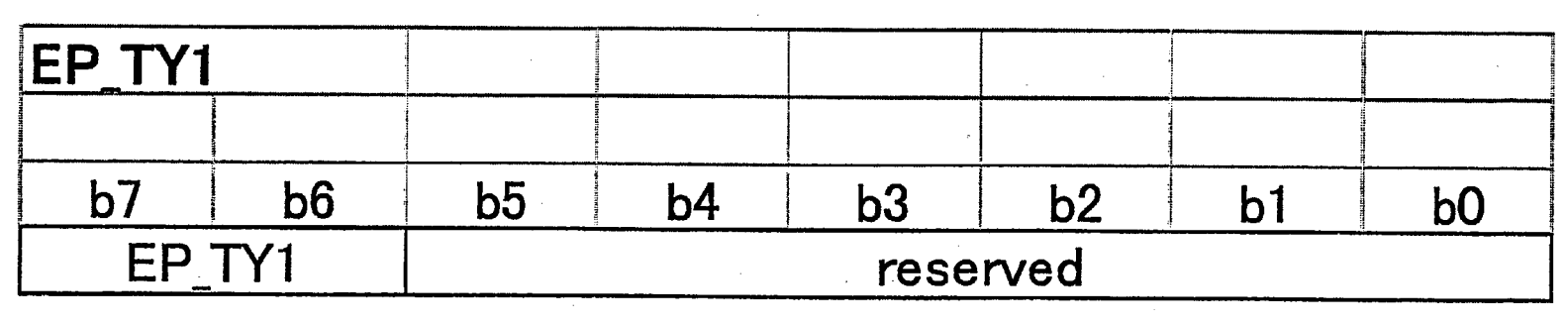

FIG. 33 is a diagram illustrating an EP_TY1 format.

FIG. 35A is a diagram showing an address space on a disc.

FIG. 35B is a chart showing a data storage amount in a track buffer.

FIG. 39A is a diagram showing video data.

FIG. 39B is a chart showing a video buffer usage.

FIG. 39C is a diagram showing the MPEG system stream.

FIG. 39D is a diagram showing audio data.

FIG. 48 is a flowchart of deletion operation of the front part of VOB in the partial deletion operation.

DETAILED DESCRIPTION OF THE PREFERRED EMBODIMENTS

The present invention will be described in detail by using a DVD recorder and a DVD-RAM according to an embodiment of the present invention.
(Logical Structure of DVD-RAM)

Figure 1:
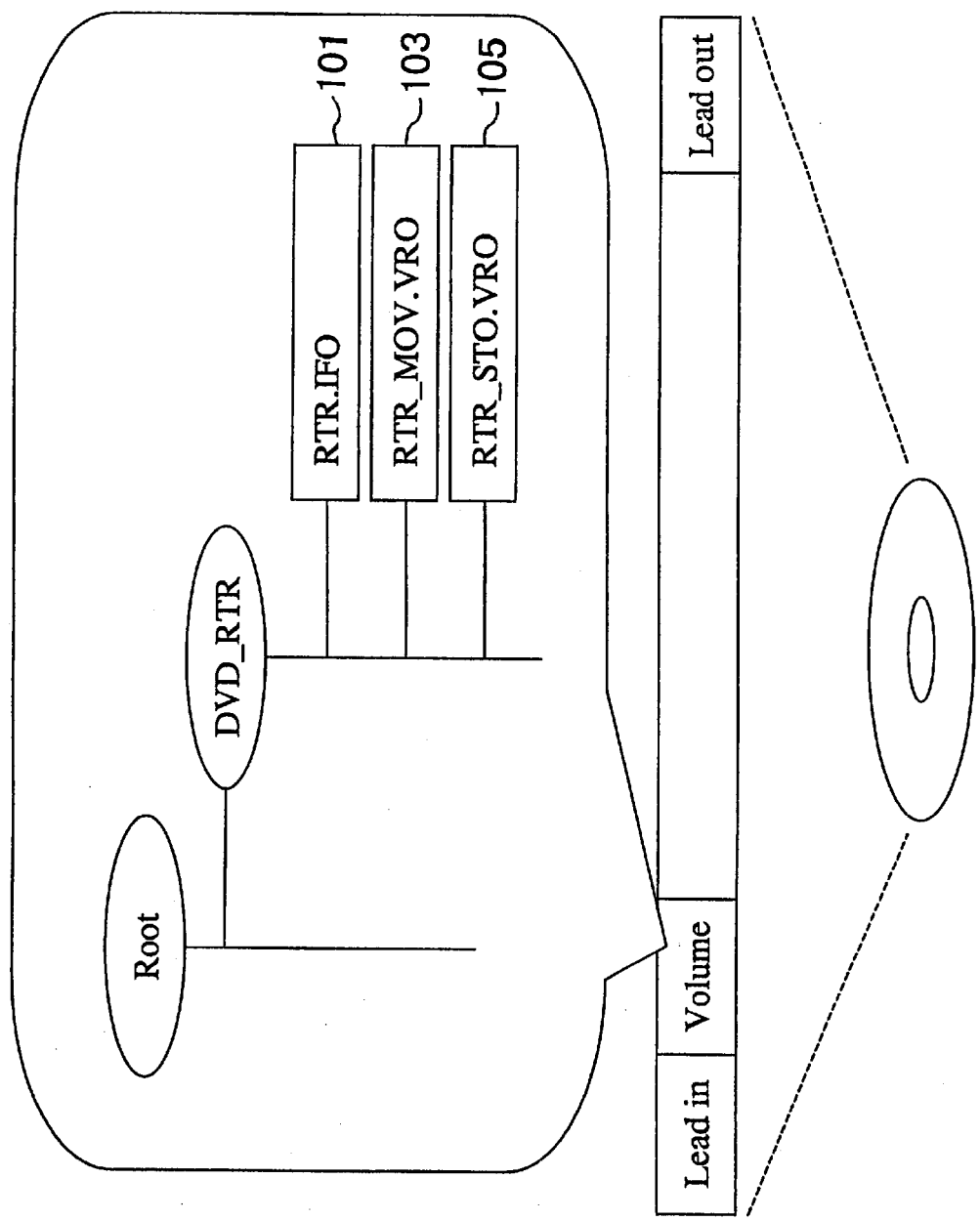
FIG. 1 is a diagram showing the logical structure of a disc in the second embodiment.

First of all, the logical structure of the DVD-RAM will be described with reference to FIG. 1. FIG. 1 shows a physical sector address on a disc and a data structure on the disc which can be seen through a file system.

In the head portion of the physical sector address is provided a lead-in groove region in which a reference signal necessary for stabilizing a servo, an identification signal with other media and the like are recorded. A data region is connected to the lead-in groove region. Logically available data are recorded in this portion. Finally, a lead-out groove region is provided which has the same reference signal as in the lead-in groove region or the like.

Management information for a file system which is referred to as volume information is recorded on the head of the data region. Since the file system is not directly related to the contents of the present application, it will be omitted. It is possible to deal with data in the disc as a directory or a file as shown in FIG. 1 through the file system.

All the data to be dealt with by the DVD recorder are put on a DVD_RTR directory immediately under a ROOT directory as shown in FIG. 1. The file to be dealt with by the DVD recorder is roughly divided into 2 kinds of files, that is, one management information file and one or more AV files. The AV file records an RTR_MOV.VRO file 103 for recording a motion picture or movie and an RTR_STO.VRO 105 file for recording a still picture and audio data which are recorded together with the still picture.

Figure 2:
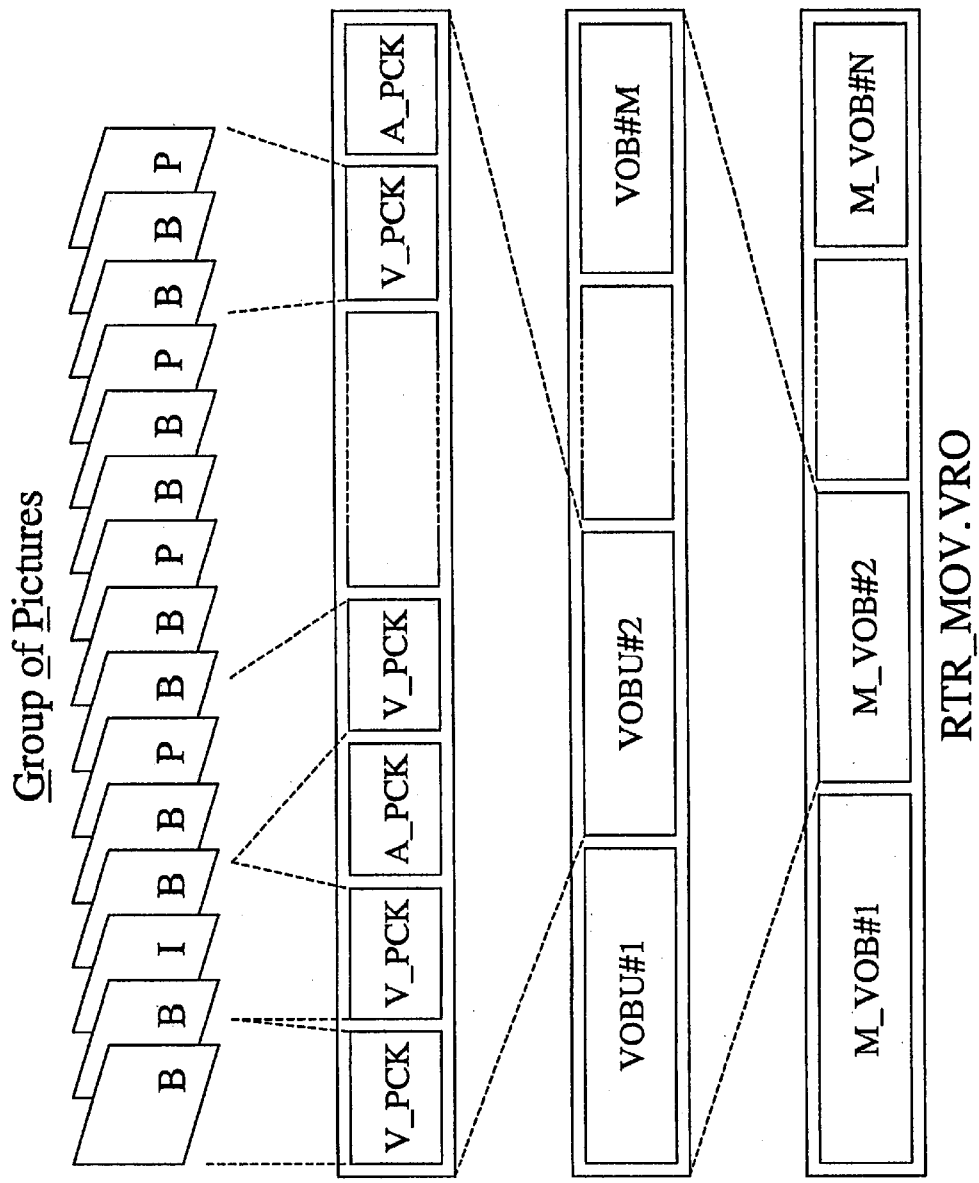
FIG. 2 is a diagram showing a structure in an AV file for a motion picture or movie data.

FIG. 2 is a diagram showing the structure of the RTR_MOV.VRO file 103 storing the motion picture. As shown in FIG. 2, M_VOB (Movie Video Object) which is the program stream of MPEG is provided in the RTR_MOV.VRO file 103 in order of recording.

The M_VOB comprises VOBUs (Video Object Units) each of which is one unit of 0.4 to 1.0 second on the basis of a video reproducing time. The VOBU comprises V_PCK (Video Pack), A_PCK (Audio Pack) and SP_PCK (Subpicture Pack). Each pack is constituted in a 2 KB unit. Moreover, video data in the VOBU comprises at least one GOP (Group of Pictures). The GOP is a decoding unit of the MPEG video and is constituted by a plurality of P and B pictures by using the I picture as a head.

Figure 3:
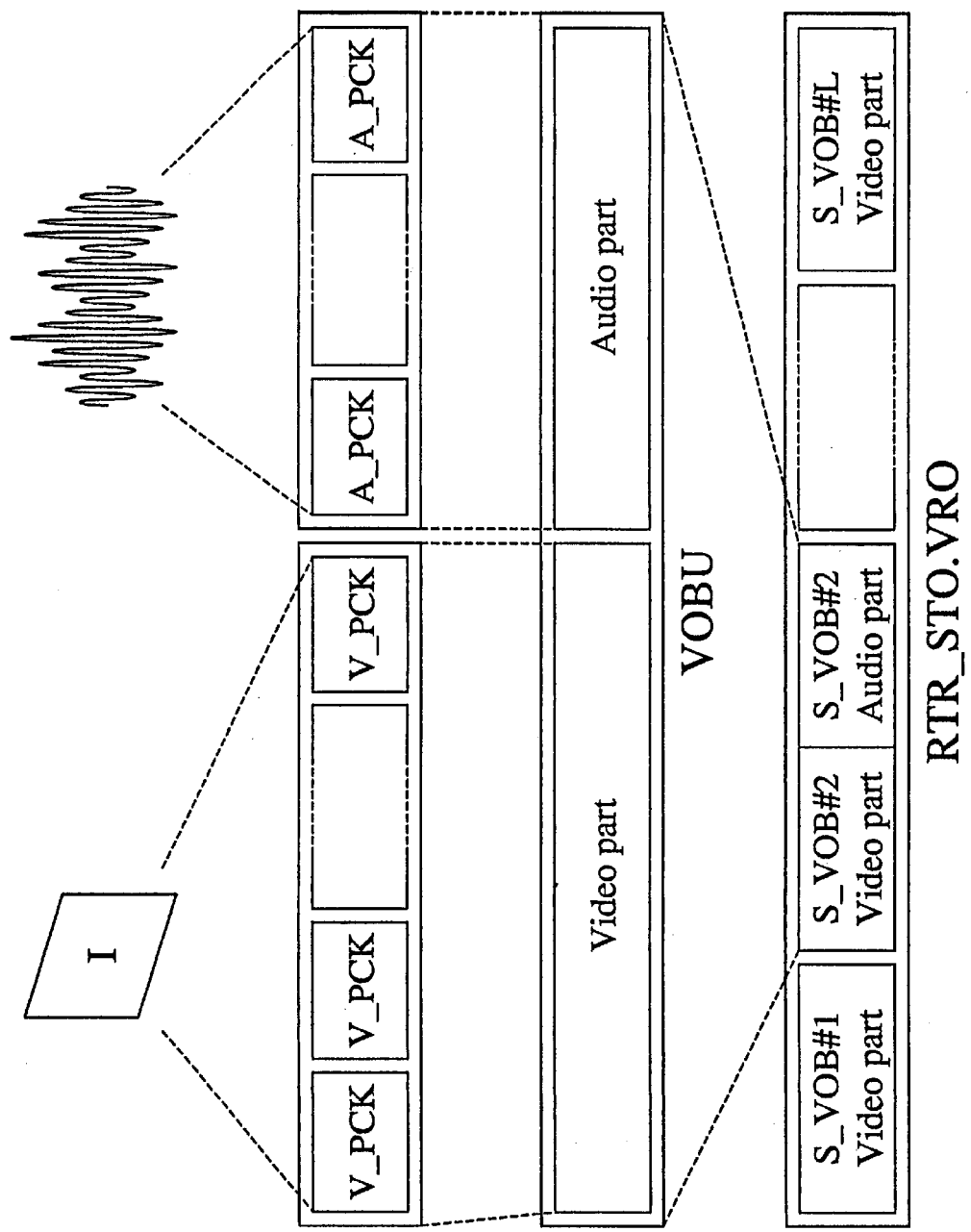
FIG. 3 is a diagram showing a structure in an AV file for a still picture.

FIG. 3 is a diagram showing the structure of the RTR_STO.VRO file 105 in which a still picture and audio data are recorded. As shown in FIG. 3, S_VOB (Still Picture Video Object) which is an MPEG program stream for the still picture is provided in the RTR_STO.VRO file 105 in order of picture recording.

A great difference between the M_VOB and the S_VOB is that in S_VOB motion picture data and audio data are not mutually multiplexed but audio data (Audio part) are successively recorded after the still picture data (Video part), in addition to the recording of the still picture data in place of the motion picture data. Moreover, the S_VOB is constituted by one VOBU, and the VOBU is constituted by the V_PCK, the A_PCK and the SP_PCK.

(AV data and Management Information)

Figure 4:
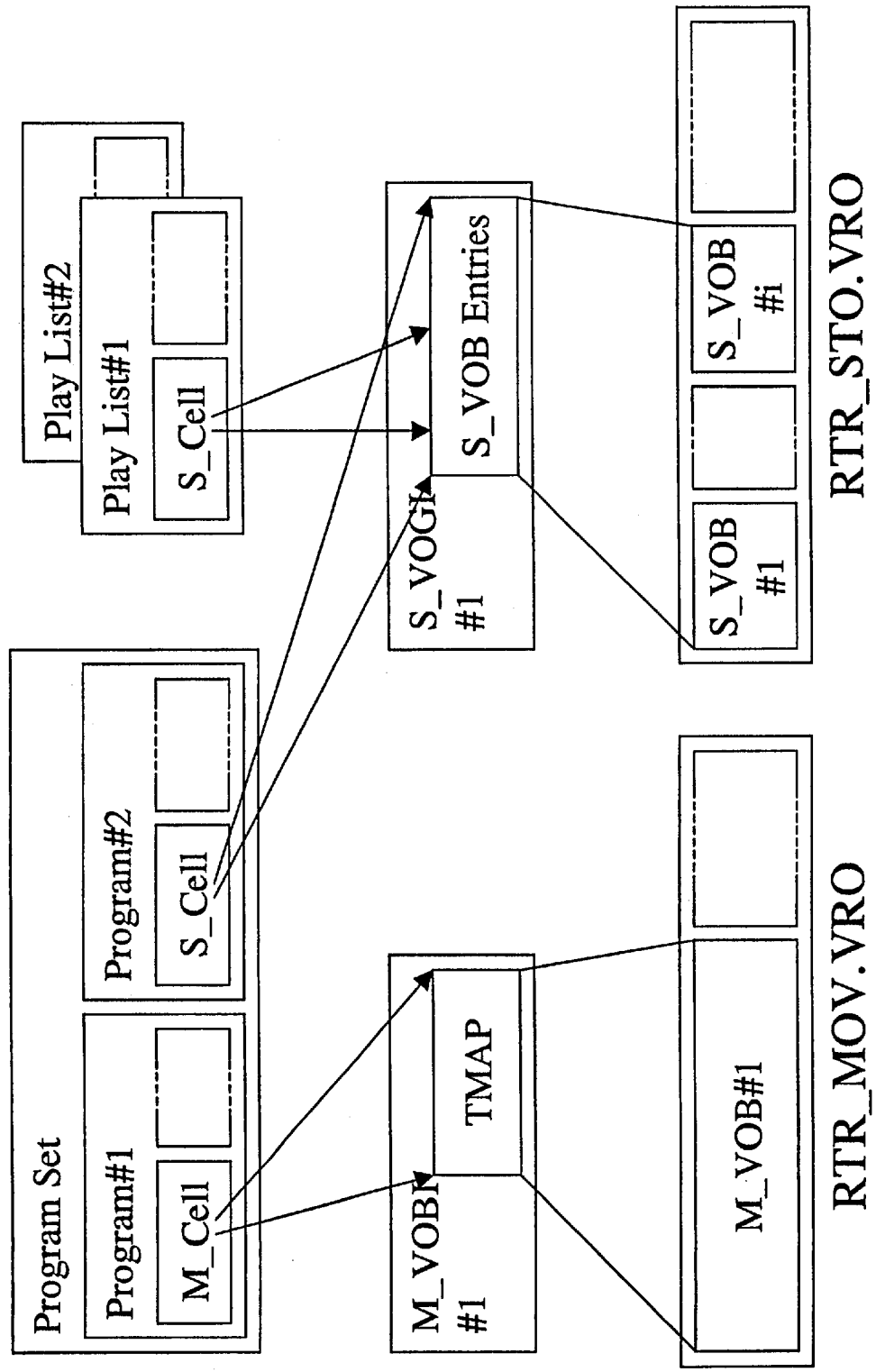
FIG. 4 is a diagram showing a relationship between AV data and management information.
Figure 5:
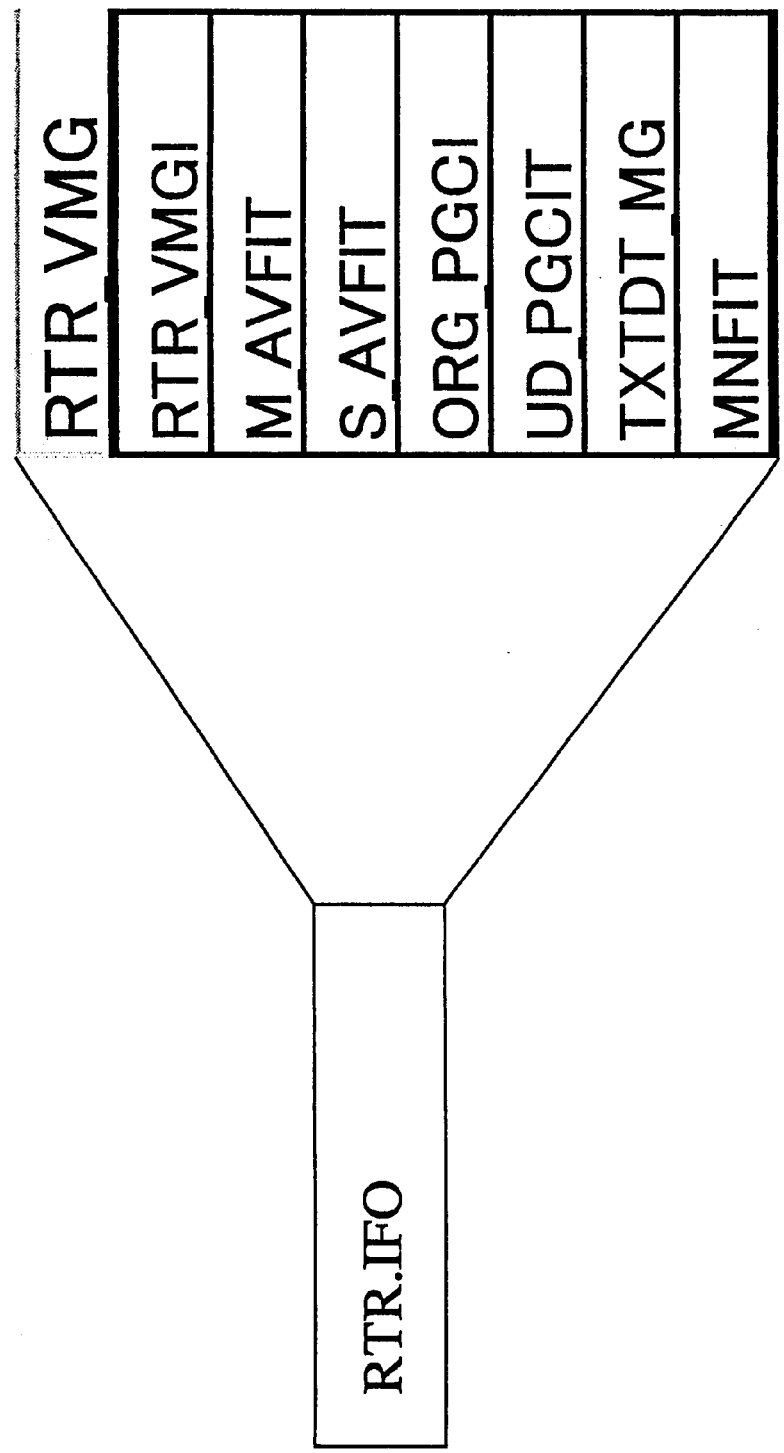
FIG. 5 is a diagram showing the structure of RTR_VMG.
Figure 6:
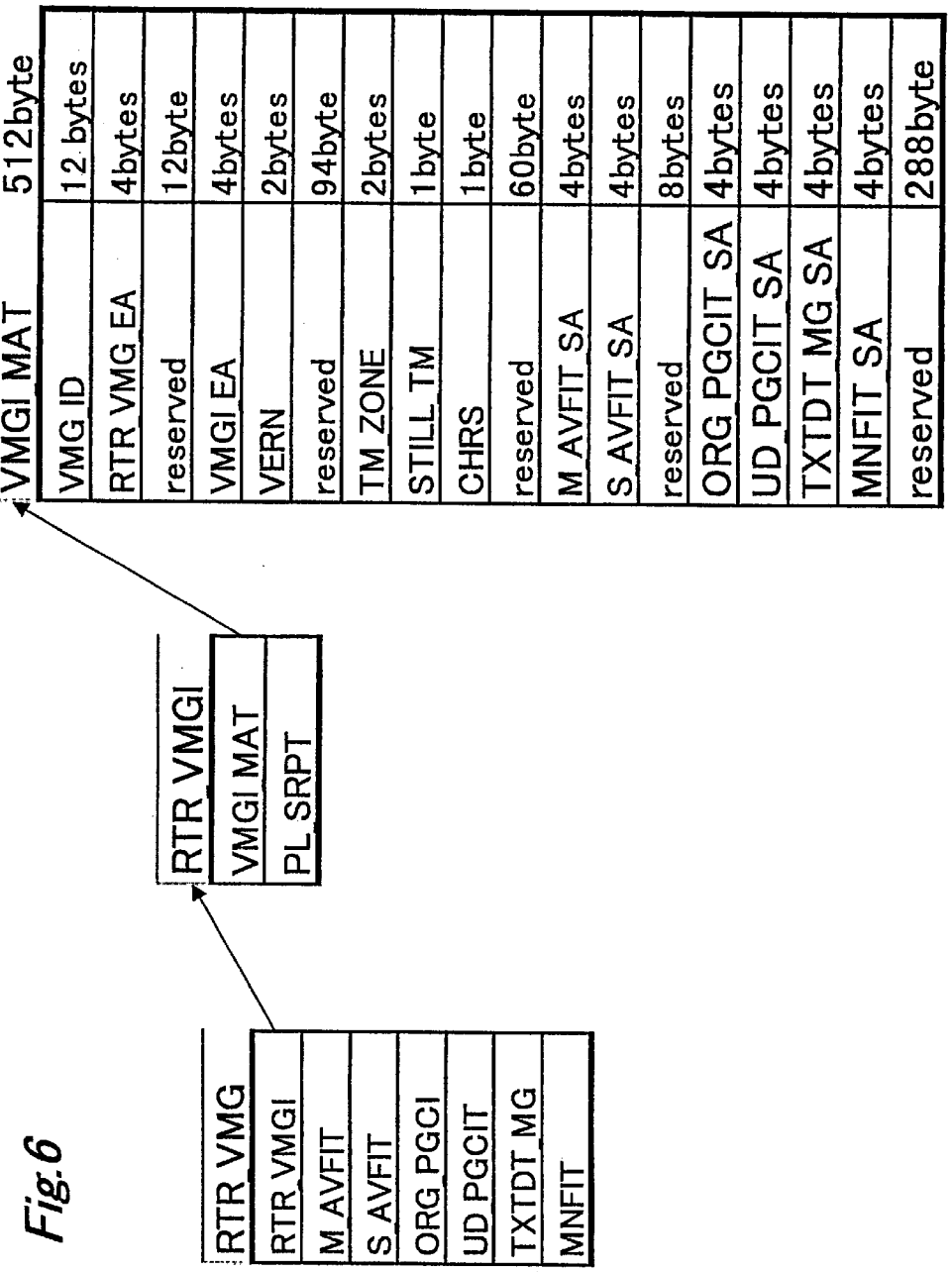
FIG. 6 is a diagram showing the structure of RTR_VMGI.
Figure 8:
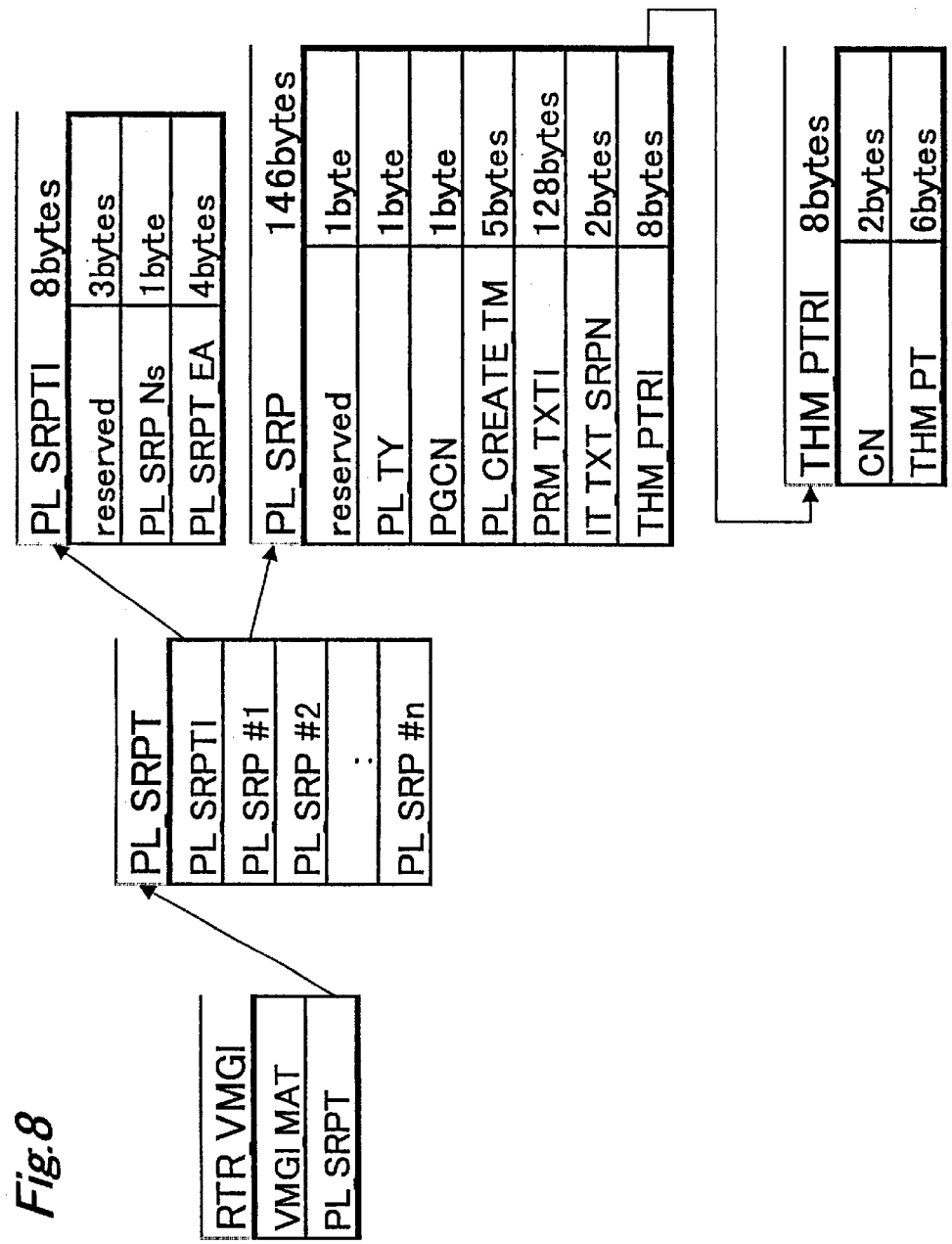
FIG. 8 is a diagram showing the structure of PL_SRP.
Figure 12:
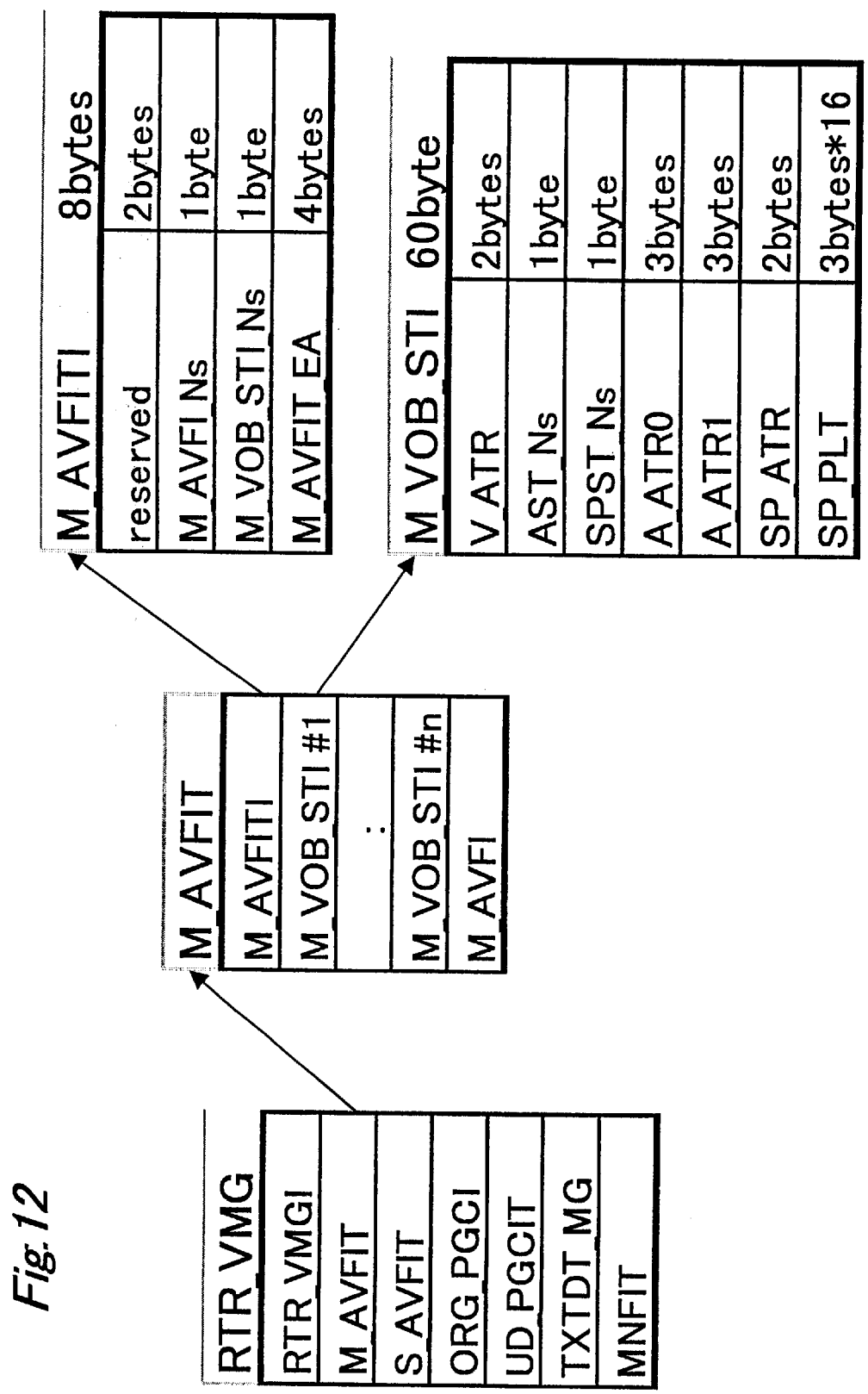
FIG. 12 is a diagram showing the structure of M_AVFIT.
Figure 15:
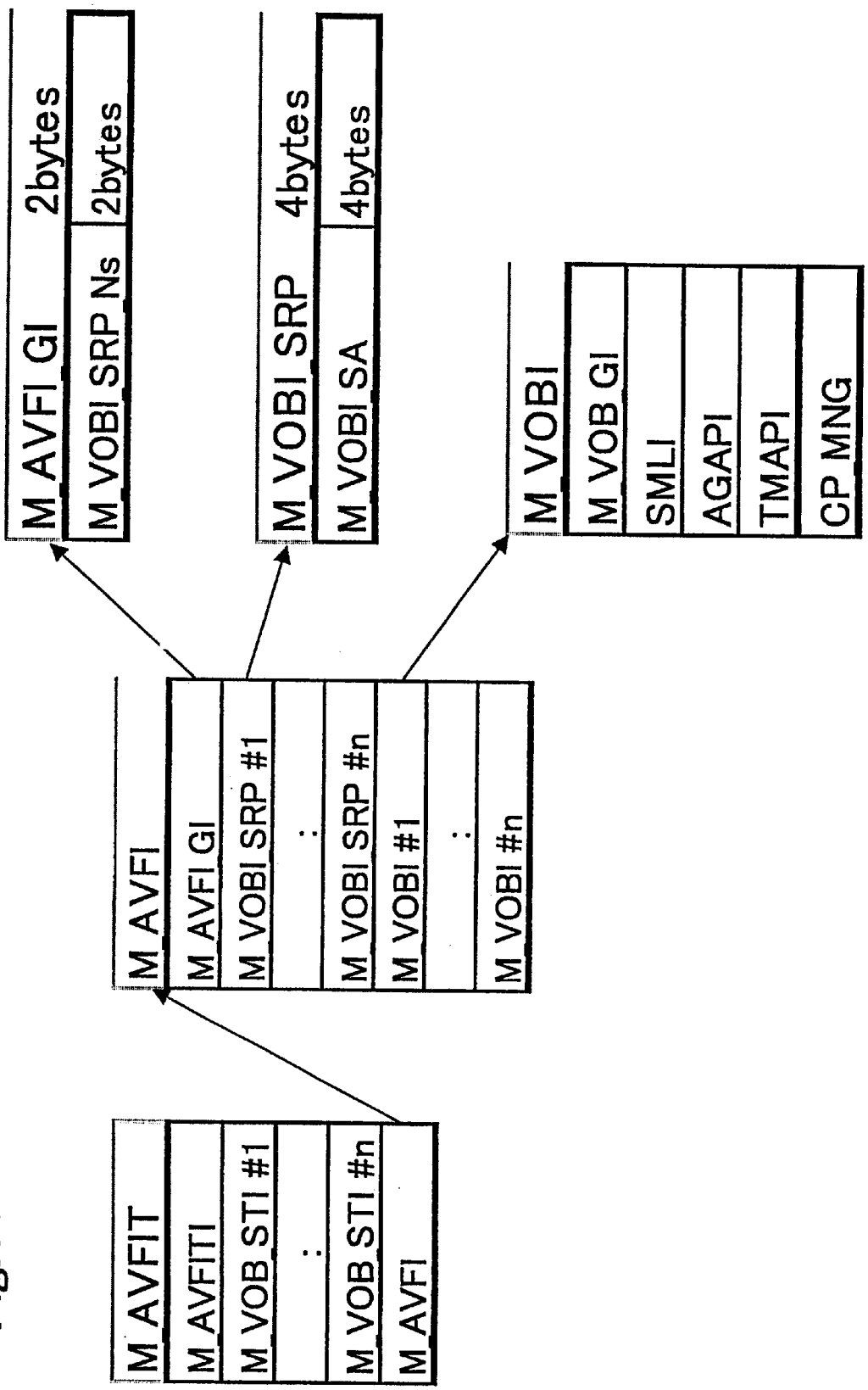
FIG. 15 is a diagram showing the structure of M_AVFI.

Next, description will be given to the relationship between the M_VOB and S_VOB described above, and management information with reference to FIG. 4.

As described above, AV data have two kinds of data, that is, the M_VOB for a movie picture and S_VOB for a still picture. Each M_VOB has management information M_VOB1, and attribute information of the corresponding M_VOB is recorded in M_VOB1. In case of the S_VOB, if management is carried out for each S_VOB, the amount of the management information is increased. Therefore, there is management information S_VOGI for each group S_VOG which is a lump of S_VOBs. S_VOGI records the attribute information of a corresponding S_VOB group.

It is important that in the MPEG stream data there is no linearity between a time and a data amount. As described above, a compressing method using a time correlation characteristic and compression using a variable length coding method which is referred to as VBR are carried out in order to implement highly efficient compression in the MPEG stream. Therefore, the time and the data amount or address information do not uniquely correspond to each other.

The M_VOBI has a filter (TMAP) for converting a time and an address, and the S_VOGI has a filter (S_VOB Entries) for converting a still picture number and an address in a group.

Next, description will be given to the management information of a reproducing sequence.

The reproducing sequence is defined as a sequence (PGC) of a cell indicative of a partial or whole interval of the M_VOB and the S_VOG. The reproducing sequence has two kinds of parts, that is, an original PGC referring to all the AV data in the disc and a user defined PGC selecting a user's preference of the AV data in the disc and defining a reproducing order (plural definitions can be obtained).

The original PGC is also referred to as a program set (Program Set), and includes a layer which is referred to as a program (Program) having a plurality of cells logically bundled therebetween. The user defined PGC is also referred to as a play list (Play List) and includes no Program therebetween differently from the original PGC.

(Management Information File)

Next, the contents of the management information file "RTR. IFO" will be described with reference to FIGS. 5 to 33.

"RTR_VMG" (FIG. 5):

Management information referred to as RTR_VMG (Real Time Recording Video Management) is recorded in the RTR.IFO file 101. The RTR_VMG comprises seven tables of RTR_VMGI, M_AVFIT, S_AVFIT, ORG_PGCI, UD_PGCIT, TXTDT_MG and MNFIT.

Next, each table will be described in detail.

"RTR_VMGI" (FIG. 6):

RTR_VMGI (Real Time Recording Video Management Information) comprises VMGI_MAT and PL_SRPT.

"VMGI_MAT" (FIG. 6):

VMGI_MT (Video Management Information Management Table) stores the following information as information related to the whole disc. A player and a recorder can first read the VMGI_MAT to roughly obtain structural information of the disc.

VMG_ID (Video Management Identifier):

VMG_ID stores an identifier "DVD_RTR_VMG0" indicating that video recording data are recorded in this disc.

RTR_VMG_EA (RTR_VMG End Address):

The end address of the RTR_VMG is recorded therein.

VMGI_EA (VMGI End Address):

The end address of the VMGI is recorded therein.

VERN (Version Number):

The version number of a recording format of the video recording data is recorded in accordance with a format shown in FIG. 7.

TM_ZONE (Time Zone):

Recorded therein is a time zone to be used by all date and time information recorded in this disc. As shown in FIG. 7, TM_ZONE comprises TZ_TY (time zone type) and TZ_OFFSET (time zone offset). TZ_TY indicates which one of the Greenwich mean time as a universal time and a standard time for each region is used for the reference of date information. TZ_OFFSET records a time difference between the date and the Greenwich mean time.

STILL_TM (Still Time):

A static time length obtained when displaying a soundless still picture is recorded.

CHRS (Character Set Code for Primary Text):

A character set code for a primary text which will be described below is recorded therein.

M_AVFIT_SA (M_AVFIT Start Address):

Start address of M_AVFIT is recorded therein. When M_AVFIT is accessed, a seek is carried out up to this start address.

S_AVFIT_SA (S_AVFIT Start Address):

Start address of S_AVFIT is recorded therein. When S_AVFIT is accessed, a seek is carried out up to this start address.

ORG_PGCI_SA (ORG_PGCI Start Address):

Start address of ORG_PGCI is recorded therein. When ORG_PGCI is accessed, a seek is carried out up to this start address.

UD_PGCIT_SA (UD_PGCIT Start Address):

Start address of UD_PGCIT is recorded therein. When UD_PGCIT is accessed, a seek is carried out up to this start address.

TXTDT_MG_SA (TXTDT_MG Start Address):

Start address of TXTDT_MG is recorded therein. When TXTDT_MG is accessed, a seek is carried out up to this start address.

MNFIT_SA (MNFIT Start Address):

Start address of MNFIT is recorded therein. When MNFIT is accessed, a seek is carried out up to this start address.

"PL_SRPT" (FIG. 8):

PL_SRPT (Play List Search Pointer Table) is a table comprising PL_SRPTI and n PL_SRPs.

"PL_SRPTI" (FIG. 8):

PL_SRPTI (Play List Search Pointer Table Information) stores the following information for accessing to PL_SRP.

PL_SRP_Ns (Number of PL_SRP):

Number of PL_SRPs is recorded therein.
PL_SRPT_EA (PL_SRPT End Address):
End address of PL_SRPT is recorded therein.
"PL_SRP" (FIG. 8):
Moreover, the following information for giving access to the user—defined PGC which is actual data of the play list is recorded in PL_SRP (Play List Search Pointer).
PL_TY (Play List Type):
Any of the following values is recorded as a value for identifying the type of a play list in accordance with a description format shown in FIG. 9.
0000b: only motion pictures
0001b: only still pictures
0010b: hybrid of motion pictures and still pictures
PGCN (PGC Number):
PGC number corresponding to the play list is recorded therein. The PGC number indicates the recording order of PGC information in UD_PGCIT which will be described below. PL_CREATE_TM (Play List Recording Time):
Information about the date and time at which the play list was created is recorded therein in accordance with the description format shown in FIG. 9.
PRM_TXTI (Primary Text Information):
Text information indicative of the contents of the play list is recorded therein. For example, in the case where a television program is picture recorded, the name of the program is recorded. Moreover, the primary text information is constituted by a field for the ASCII code and a field of a character code set specified by the above-mentioned CHRS.
IT_TXT_SRPN (IT_TXT_SRP Number):
When information indicative of the contents of the play list are optionally recorded as IT_TXT in addition to the above-mentioned primary text, the IT_TXT_SRP number is recorded as link information to the IT_TXT to be recorded in the TXTDT_MG. The IT_TXT_SRP number indicates the recording order in TXTDT_MG which will be described below.
THM_PTRI (Thumb Nail Pointer Information):
Thumb nail information which is representative of the play list is described.
"THM_PTRI" (FIG. 8):
In THM_PTRI is recorded the following information indicative of the position of a thumb nail.
CN (Cell Number):
Cell number of a cell including a thumb nail is recorded therein. The cell number indicates the recording order of cell information in the UD_PGCI to which the play list corresponds.
THM_PT (Thumb Nail Point):
When a cell indicated by the above-mentioned CN is a motion picture cell, the display time of a video frame to be used as a thumb nail is recorded in accordance with a PTM description format shown in FIG. 10. The PTM is given in accordance with the reference time of a time stamp described in the MPEG program stream.
Moreover, when the cell indicated by the above-mentioned CN is a still picture cell, the still picture VOB entry number of a still picture to be used as the thumb nail is recorded in accordance with an S_VOB_ENTN description format shown in FIG. 11. The still picture VOB entry number indicates the recording order of the still picture VOB entry in a still picture VOB group indicated by this cell.
"M_AVFIT" (FIG. 12):
M_AVFIT (Motion picture AV File Information Table) stores management information corresponding to motion picture AV file "RTR_MOV.VRO" and comprises M_AVFITI, M_VOB_STI and M_AVFI.

"M_AVFITI" (FIG. 12):
M_AVFITI (Motion picture AV File Information Table Information) stores the following information necessary for giving access to M_VOB_STI and M_AVFI.
M_AVFI_Ns (Number of Motion picture AV File Information):
Number of fields of succeeding AVFI information is indicated therein. When the value is "0", there exists no AVFI, while when the value is "1", there exists AVFI. Moreover, the presence of the AVFI also corresponds to that of RTR_MOV.VRO which is the AV file for motion pictures.
M_VOB_STI_Ns (Number of M_VOB_STI):
Number of fields of succeeding M_VOB_STI is indicated therein.
M_AVFIT_EA (M_AVFIT End Address):
The end address of M_AVFIT is recorded therein.
"M-VOB_STI" (FIG. 12):
M_VOB_STI (Movie VOB Stream Information) stores the following information as the stream information of movie VOB.
V_ATR (Video Attribute):
The following video attribute information is recorded in accordance with a format shown in FIG. 13.
Video Compression Mode:
Any one of the following values for identifying a video compression mode is recorded therein.
00b: MPEG-1
01b: MPEG-2
TV System:
Any one of the following values for identifying a television system is recorded therein.
00b: 525/60 (NTSC)
01b: 625/50 (PAL)
Aspect Ratio:
Any one of the following values for identifying a resolution ratio is recorded therein.
00b: 4×3
01b: 16×9
line21_switch_1:
Recorded therein is any one of the following values for identifying that closed caption data for a field 1 are recorded or not in a video stream.
1b: Recorded
0b: Not recorded
line21_switch_2:
Recorded therein is any one of the following values for identifying that closed caption data for a field 2 are recorded or not in the video stream.
1b: Recorded
0b: Not recorded
Video Resolution:
Any one of the following values for identifying a video resolution is recorded therein.
000b: 720×480 (NTSC), 720×576 (PAL)
001b: 702×480 (NTSC), 702×576 (PAL)
010b: 352×480 (NTSC), 352×576 (PAL)
011b: 352×240 (NTSC), 352×288 (PAL)
100b: 544×480 (NTSC), 544×576 (PAL)
101b: 480×480 (NTSC), 480×576 (PAL)
AST_Ns (Number of Audio Streams):
Number of audio streams recorded in corresponding VOB is recorded therein.

SPST_Ns (Number of Sub-picture Streams):
Number of sub-picture streams recorded in corresponding VOB is recorded therein.

A_ATR0 (Attribute of Audio Stream 0):
The following audio attribute information corresponding to an audio stream 0 (corresponding to the audio stream #1 described above) is recorded in accordance with a format shown in FIG. 13.

Audio Coding Mode:
Any one of the following values for identifying an audio compressing method is recorded.
000b: Dolby AC-3
001b: MPEG audio having no extended stream
010b: MPEG audio having an extended stream
01b: linear PCM Application Flag:
Any one of the following values for identifying application information is recorded therein.
00b: No application
01b: Mixed audio channel number
10b: With auxiliary voice Quantization/DRC:
When using the MPEG audio, any one of the following values for identifying the presence of DRC (Dynamic Range Control) information is recorded therein.
00b: DRC data are not included in the MPEG stream.
01b: DRC data are included in the MPEG stream.
When using the LPCM audio, the following value for identifying the Quantization is recorded therein.
00b: 16 bits fs:
The following value for identifying a sampling frequency is recorded therein.
00b: 48 kHz Number of Audio Channels:
Any one of the following values for identifying the number of audio channels is recorded therein.
0000b: one channel (monophonic)
0001b: two channels (stereo)
0010b: three channels
0011b: four channels
0100b: five channels
0101b: six channels
0110b: seven channels
0111b: eight channels
1001b: two channels (dual monophonic)

Bitrate:
Any one of the following values for identifying a bit rate is recorded therein.
0000 0001b: 64 kbps
0000 0010b: 89 kbps
0000 0011b: 96 kbps
0000 0100b: 112 kbps
0000 0101b: 128 kbps
0000 0110b: 160 kbps
0000 0111b: 192 kbps
0000 1000b: 224 kbps
0000 1001b: 256 kbps
0000 1010b: 320 kbps
0000 1011b: 384 kbps
0000 1100b: 448 kbps
0000 1101b: 768 kbps
0000 1110b: 1536 kbps It is important that only the bit rate of a basic stream excluding an extended stream is recorded when the corresponding audio stream is the MPEG audio stream having the extended stream. The reason is that the extended stream cannot be expressed by the above-mentioned fixed bit rate because it carries out the compression using the variable length coding method.

A_ATR1 (Attribute of Audio Stream 1):
The following audio attribute information corresponding to an audio stream 1 (corresponding to the above described audio stream #2 provided for after-recording) is recorded in accordance with a format shown in FIG. 13. Individual fields are the same as the above-mentioned A_ATR0.

SP_ATR (Sub-picture Attribute):
The following sub-picture attribute information is recorded in accordance with a format as shown in FIG. 14.

Application Flag:
Any one of the following values for identifying application information is recorded therein.
00b: No application
01b: Subtitles
10b: Animation SP_PLT (Sub-picture Color Palette):
Color palette information for a sub-picture is recorded in accordance with the format shown in FIG. 14.

"M_AVFI" (FIG. 15):
M_AVFI (Motion picture AV File Information) comprises information necessary for giving access to movie VOB (M_VOB), M_AVFI_GI, M_VOBI_SRP and M_VOBI.

"M_AVFI_GI" (FIG. 15):
M_VOBI_SRP_Ns is recorded in M_AVFI_GI (Motion picture AV File Information General Information).

M_VOBI_SRP_Ns (Number of Movie VOB Information Search Pointer):
Number of M_VOBI_SRP is recorded therein.

"M-VOBI_SRP" (FIG. 15):
M_VOBI_SRP (Movie VOB Information Search Pointer) stores address information for accessing each M_VOBI.

M_VOBI_SA (Movie VOB Information Start Address):
The start address of M_VOBI is recorded therein. The indicated address herein can be used in seeking operation for accessing the VOB information.

"M_VOBI" (FIG. 16):
M_VOBI (Movie VOB Information) comprises management information of movie VOB, M_VOB_GI, SMLI, AGAPI, TMAPI and CP_MNGI.

"M VOB_GI" (FIG. 16):
M_VOB_GI (Movie VOB General Information) stores the following information as the general information of the Movie VOB.

VOB_TY (VOB Type):
The attribute information of VOB is recorded therein in accordance with a format shown in FIG. 17.

TE:
Any one of the following values for identifying the status of the VOB is recorded therein.
0b: Normal status
1b: Temporary deletion status A0_STATUS:
Any one of the following values for identifying the status of an audio stream 0 is recorded therein.
00b: Original status
01b: Rewritten status

A1_STATUS:

Any one of the following values for identifying the status of an audio stream 1 is recorded therein.

00b: Original status

01b: Rewritten status

10b: Dummy status for after-recording

11b: After-recorded status

APS:

Any one of the following values for identifying analog copy preventing signal control information is recorded therein.

00b: No APS

01b: Type 1

10b: Type 2

11b: Type 3

SML_FLG:

Any one of the following values for identifying whether or not the VOB is seamlessly reproduced together with the VOB present just before.

0b: Seamless reproduction is impossible.

1b: Seamless reproduction is possible.

A0_GAP_LOC:

Recorded therein is any one of the following values indicative of the presence of an audio reproducing gap in the audio stream 0 and VOBU having an audio reproducing gap interval multiplexed.

00b: No audio reproducing gap

01b: Audio reproducing gaps are multiplexed to a head VOBU.

10b: Audio reproducing gaps are multiplexed to a second VOBU.

11b: Audio reproducing gaps are multiplexed to a third VOBU.

A1_GAP_LOC:

Recorded therein is any one of the following values indicative of the presence of an audio reproducing gap in the audio stream 1 and VOBU having an audio reproducing gap interval multiplexed.

00b: No audio reproducing gap

01b: Audio reproducing gaps are multiplexed to a head VOBU.

10b: Audio reproducing gaps are multiplexed to a second VOBU.

11b: Audio reproducing gaps are multiplexed to a third VOBU.

VOB_REC_TM (VOB Recording Time):

The date and time on which the VOB was recorded is recorded therein in the same format as in the PL_CREATE_TM shown in FIG. 9. It is important that the recording time indicates the recording date and time of the display video frame of the VOB head and the VOB_REC_TM 111 should also be corrected when the VOB head video frame is changed by edit or partial deletion. When a recording time is to be displayed synchronously with the reproduction of the VOB as often seen in a cam coder, the recording time to be displayed can be obtained by adding an elapsed time in the VOB to the VOB_REC_TM 111.

VOB_REC_TM_SUB (VOB Recording Time Error Information):

VOB_REC_TM_SUB 113 is a field for absorbing the error of the VOB_REC_TM 111 to be modified when the VOB head video frame is changed by the edit and the partial deletion on the VOB. The VOB_REC_TM 111 has only information about year, month, day, hour, minute and second as shown in FIG. 9. Therefore, in the case where the edit or deletion is carried out in each frame or field, the VOB_REC_TM 111 cannot provide a sufficient precision. Accordingly a fraction or error generated by the edit or deletion is recorded in this VOB_REC_TM_SUB field 113.

M_VOB_STIN (M_VOB_STI Number):

M_VOB_STI number corresponding to the VOB is recorded therein. M VOB#STI number shown herein is the recording order in the above-mentioned M_VOB_STI table.

VOB_V_S_PTM (VOB Video Start PTM):

The display start time of the VOB is recorded therein with the same reference time as a time stamp in a stream.

VOB_V_E_PTM (VOB Video End PTM):

The display end time of the VOB is recorded therein with the same reference time as a time stamp in a stream. It should be noted that the time stamp in the stream indicates the display start time of the frame, while VOB_V_E_PTM stores the display end time, that is, a time obtained by adding the display period of the frame to the display start time.

"SMLI" (FIG. 16):

SMLI (Seamless Information) stores the following information necessary for seamless reproduction with the last VOB. Moreover, this field is provided only when "1b" is recorded in the above-mentioned SML_FLG.

VOB_FIRST_SCR (VOB Head SCR):

SCR in the first pack of the VOB is recorded.

PREV_VOB_LAST_SCR (Previous VOB Last SCR):

SCR of the last pack of the previous VOB is recorded therein.

"AGAPI" (FIG. 16):

AGAPI (Audio Gap Information) stores the following information necessary for processing an audio reproducing gap in a decoder. Moreover, this field is provided in the case where a value other than "00b" is recorded in either the above-mentioned A0_GAP_LOC or A1_GAP_LOC.

VOB_A_STP_PTM (VOB Audio Stop PTM):

The time of the audio reproducing gap, that is, the time that the decoder temporarily stops audio reproduction is recorded therein with the same reference time as a time stamp in a stream.

VOB_A_GAP_LEN (VOB Audio Gap Length):

The time length of an audio reproducing gap is recorded with a precision of 90 kHz.

"CP_MNGI" (FIG. 16):

CP_MNGI (Copy Management Information) comprises copy management information for the VOB, CPG_STATUS and CPGI.

CPG_STATUS (Copy Protecting Status):

As the copy protecting status of the VOB, values for identifying "copy free" or "one generation copying" are recorded therein.

CPGI (Copy Protecting Information):

Copy protecting information applied to the VOB is recorded therein.

"TMAPI" (FIG. 18):

TMPAI (Time Map Information) comprises TMAP_GI, TM_ENT and VOBU_ENT.

"TMAP_GI" (FIG. 18):

TMAP_GI (TMAP General Information) comprises TM_ENT_Ns, VOBU_ENT_Ns, TM_OFS and ADR_OFS. Each field is as follows.

TM_ENT_Ns (Number of TM_ENT):

Number of fields of TM_ENT which will be described below is recorded therein.

VOBU_ENT_Ns (Number of VOBU_ENT):

Number of fields of VOBU_ENT which will be described below is recorded therein.

TM_OFS (Time Offset):
The offset value of a time map is recorded therein with a video field precision.

ADR_OFS (Address Offset):
An offset value in the AV file of the head of the VOB is recorded therein.

"TM_ENT" (FIG. 18):
TM_ENT (Time Entry) comprises the following fields as access point information for each constant interval TMU. TMU for NTSC is 600 video fields (NTSC), while TMU for PAL is 500 video fields.

VOBU_ENTN (VOBU_ENT Number):
The entry number of VOBU including a time indicated by the TM_ENT (TMU×(N−1)+TM_OFS for Nth TM_ENT) is recorded therein.

TM_DIFF (Time Difference):
A difference between a time indicated by the TM_ENT and the display start time of VOBU indicated by the above-mentioned VOBU_ENTN is recorded therein.

VOBU_ADR (VOBU Address):
A head address in the VOB of the VOBU indicated by the above-mentioned VOBU_ENTN is recorded therein.

"VOBU_ENT" (FIG. 19):
VOBU_ENT (VOBU Entry) stores the following structure information of the corresponding VOBU in a format shown in FIG. 19. By adding succeeding fields in order, it is possible to obtain a time and address information necessary for accessing desirable VOBU.

ISTREF_SZ:
Number of packs from a VOBU head pack to a pack including last data of the head I picture in the VOBU is recorded therein.

VOBU_PB_TM:
The reproducing time length of the VOBU is recorded therein.

VOBU_SZ:
The data amount of the VOBU is recorded therein.

"S_AVFIT" (FIG. 20):
S_AVFIT (Still picture AV File Information Table) has management information corresponding to the still picture AV file "RTR_STO.VRO" recorded therein, and comprises S_AVFITI, S_VOB_STI and S_AVFI.

"S_AVFITI" (FIG. 20):
S_AVFITI (Still Picture AV File Information Table Information) stores the following information necessary for accessing S_VOB_STI and S_AVFI.

S_AVFI_Ns (Number of Still Picture AV File Information):
"0" or "1" is recorded therein as the S_AVFI number. This value also corresponds to the still picture AV file number, that is, the presence of the RTR_STO.VRO file.

S_VOB_STI_Ns (Number of Still Picture VOB Stream Information):
Number of S_VOB_STI which will be described below is recorded therein.

S_AVFI_EA (Still Picture AV File Information End Address):
The end address of S_AVFI is recorded therein.

"S_VOB_STI" (FIG. 20):
In S_VOB_STI (Still Picture VOB Stream Information) is recorded the following information as the stream information of the still picture VOB.

V_ATR (Video Attribute):
Video compression mode, TV system, Aspect ratio, and Video resolution are recorded therein as video attribute information. Individual fields are the same as V_ATR in the above-mentioned M_VOB_STI.

OA_ATR (Audio Stream Attribute):
Audio coding mode, Application Flag, Quantization/DRC, fs, and Number of Audio channels are recorded as audio stream attribute information. Individual fields are the same as A_ATR0 in the above-mentioned M_VOB_STI.

SP_ATR (Sub-picture Attribute):
Application Flag is recorded therein as sub-picture attribute information. The field is the same as SP_ATR in the above-mentioned M_VOB_STI.

SP_PLT (Sub-picture Color Palette):
Color palette information for a sub-picture is recorded therein. A recording format is the same as SP_PLT in the above-mentioned M_VOB_STI.

"S_AVFI" (FIG. 23):
S_AVFI (Still Picture AV File Information) comprises information necessary for accessing a still picture VOG, S_AVFI_GI, S_VOGI_SRP and S_VOGI.

"S_AVFI_GI" (FIG. 23):
S_AVFI_GI (Still Picture AV File information General Information) stores S_VOGI_SRP_Ns.

S_VOGI_SRP_Ns (Number of Still Picture VOB Group Search Pointer):
Number of fields of S_VOGI_SRP which will be described below is recorded therein.

"S_VOGI_SRP" (FIG. 23):
S_VOGI_SRP (Static VOB Group Information Search Pointer) stores S_VOGI_SA.

The start address of S_VOGI is recorded in the S_VOGI_SA (Still Picture VOB Group Information Start Address).

"S_VOGI" (FIG. 23):
The S_VOGI (Still Picture VOB Group Information) comprises the management information of the still picture VOB, S_VOGI_GI, S_VOB_ENT and CP_MNGI.

"S_VOG_GI" (FIG. 23):
The following information is recorded as the general information of a still picture VOB group in S_VOG_GI (Still Picture VOB Group General Information).

S_VOB_Ns (Number of Still Picture VOBS):
Number of still picture VOBs in the still picture VOB group is recorded therein.

S_VOB_STIN (S_VOB_STI Number):
Recorded therein is S VOB_STI number of S_VOB_STI which stores the stream information of the still picture VOB. The S_VOB_STI number is the recording order in the above-mentioned S_VOB_STI table.

FIRST_VOB_REC_TM (First VOB Recording Time):
The recording date and time information of the first (head) still picture VOB in the still picture VOB group is recorded therein.

LAST_VOB_REC_TM (Last VOB Recording Time):
The recording date and time information of the last still picture VOB in the still picture VOB group is recorded therein.

S_VOB_SA (Still Picture VOB Group Start Address):
The start address of the still picture VOB group in the RTR_STO.VRO file is recorded therein.

"CP_MNGI":
CP_MNGI (Copy Management Information) stores copy management information related to the still picture VOB group. Individual fields are the same as the CP_MNGI of the above-mentioned M_VOBI.

"S_VOB_ENT" (FIG. 24):
S_VOB_ENT (Still Picture VOB Entry) corresponds to individual still picture VOBs in the still picture VOB group, and is divided into the following types A and B depending on the presence of audio data.

"S_VOB_ENT (Type A)" (FIG. 24):

The type A comprises S_VOB_ENT_TY and V_PART_SZ. Individual fields are as follows.

S_VOB_ENT_TY (Still Picture VOB Entry Type):

The type information of the still picture VOB is recorded therein in a format shown in FIG. 25.

MAP_TY:

Any one of the following values for identifying the type A or the type B is recorded therein.

00b: Type A
01b: Type B

TE:

Any one of the following values for identifying the status of the still picture VOB is recorded therein.

0b: Normal status
1b: Temporary deletion status

SPST_Ns:

Number of sub-picture streams in the still picture VOB is recorded therein.

V_PART_SZ (Video Part Size):

The data amount of the still picture VOB is recorded therein.

"S_VOB_ENT (Type B)" (FIG. 24):

The type B has A_PART_SZ and A_PB_TM in addition to S_VOB_ENT_TY and V_PART_SZ. Individual fields are as follows.

S_VOB_ENT_TY (Still Picture VOB Entry Type):

The type information of the still picture VOB is recorded therein. Individual fields are the same as the above-mentioned type A.

V_PART_SZ (Video Part Size):

The data amount of a video part in the still picture VOB is recorded therein.

A_PART_SZ (Audio Part Size):

The data amount of an audio part in the still picture VOB is recorded therein.

A_PB_TM (Audio Reproducing Time):

The reproducing time length of the audio part of the still picture VOB is recorded.

"UD_PGCIT" (FIG. 26):

UD_PGCIT (User-Defined PGC Information Table) comprises UD_PGCITI, UD_PGCI_SRP and UD_PGCI.

"UD_PGCITI" (FIG. 26):

UD_PGCITI (User-Defined PGC Information Table Information) stores the following information constituting the user-defined PGC information table.

UD_PGCI_SRP_Ns (Number of User-Defined PGC Information Search Pointers):

Number of UD_PGCI_SRP is recorded therein.

UD_PGCIT_EA (User-Defined PGC Information Table End Address):

The end address of UD_PGCIT is recorded therein.

"UD_PGCI_SRP" (FIG. 26):

UD_PGCI_SA is recorded in UD_PGCI_SRP (User-Defined PGC Information Search Pointer).

UD_PGCI_SA (User-Defined PCG Information Start Address):

The start address of UD_PGCI is recorded in UD_PGCI_SA. A seek is carried out up to a recorded address when the PGCI is accessed.

"UD_PGCI" (FIG. 26):

The details of the UD_PGCI (User-Defined PGC Information) will be described in the following PGCI.

"O_PGCI" (FIG. 5):

The details of O_PGCI (Original PGC Information) will be described in the following PGCI.

"TXTDT_MG" (FIG. 27):

TXTDT_MG (Text Data Management) comprises TXTDTI, IT_TXT_SRP and IT_TXT. Individual fields are as follows.

"TXTDTI" (FIG. 27):

TXTDTI (Text Data Information) comprises CHRS, IT_TXT_SRP_Ns and TXTDT_MG_EA.

CHRS (Character Set Code):

A character set code to be used for the IT_TXT is recorded therein.

IT_TXT_SRP_Ns (Number of IT_TXT Search Pointers):

Number of the IT_TXT_SRP is recorded therein.

TXTDT_MG_EA (Text Data Management End Address):

The end address of the TXTDT_MG is recorded therein.

"IT_TXT_SRP" (FIG. 27):

IT_TXT_SRP (IT_TXT Search Pointer) stores the following as access information to corresponding IT_TXT.

IT_TXT_SA (IT_TXT Start Address):

The start address of the IT_TXT is recorded therein. When the IT_TXT is accessed, a seek is carried out up to this address.

IT_TXT_SZ (IT_TXT Size):

The data size of the IT_TXT is recorded therein. When the IT_TXT is to be read, data with only this size is read.

"IT_TXT" (FIG. 27):

The IT_TXT comprises a plurality of sets or one set, each set having IDCD (identification code), TXT (text) corresponding to the IDCD and TMCD (termination code). When there is no TXT corresponding to the IDCD, the IDCD and the TMCD may make a set without TXT. The IDCD is defined as follows.

Genre Code:

30h: Movie
31h: Music
32h: Drama
33h: Animation
34h: Sports
35h: Documentary
36h: News
37h: Weather
38h: Education
39h: Hobby
3Ah: Entertainment
3Bh: Art (play, opera)
3Ch: Shopping Input Source Code:

60h: Broadcasting station
61h: Cam coder
62h Photograph
63h: Memo
64h: Others

"PGCI" (FIG. 28):

PGCI (PGC Information) has a data structure which is common to O_PGCI and UD_PGCI, and comprises PGC_GI, PGI, CI_SRP and CI.

"PGC_GI" (FIG. 28):

PGC_GI (PGC General Information) comprises PG_Ns and CI_SRP_Ns as the PGC general information. Individual fields are as follows.

PG_Ns (Number of Programs):

Number of programs in the PGC is recorded therein. For the user-defined PGC, "0" is recorded in this field because the user-defined PEGC has no program.

CI_SRP_Ns (Number of CI_SRP):
Number of CI_SRP which will be described below is recorded.

"PGI" (FIG. 28):
PGI (Program Information) comprises PG_TY, C_Ns, PRM_TXTI, IT_TXT_SRPN and THM_PTRI. Individual fields are as follows.

PG_TY (Program Type):
The following information indicative of the status of this program is recorded therein by using a format shown in FIG. 29.
Protect (protect):
0b: Normal status
1b: Protect status
C_Ns (Number of Cells):
Number of cells in this program is described.
PRM_TXTI (Primary Text Information):
Text information indicative of the contents of this program is recorded therein. The details are the same as in the above-mentioned PL_SRPT.
IT_TXT_SRPN (IT_TXT_SRP Number):
In the case where information indicative of the contents of this program is optionally recorded as the IT_TXT in addition to the above-mentioned primary text, the number of IT_TXT_SRP recorded in the TXTDT_MG is recorded in this field.
THM_PTRI (Thumb: Nail Pointer Information):
Thumb: nail information which is representative of this program is described therein. The details of THM_PTRI are the same as in the THM_PTRI of the above-mentioned PL_SRPT.

"CI_SRP" (FIG. 28):
CI_SRP (Cell Information Search Pointer) stores address information for accessing the cell information.
CI_SA (Cell Information Start Address):
The start address of the cell information is recorded therein. In the case where the cell is accessed, a seek is carried out up to this address.

"CI" (FIG. 30):
CI (Cell Information) is classified into MI_CI for a motion picture and S_CI for a still picture.

"M_CI" (FIG. 30):
M_CI (Motion picture Cell Information) comprises M_C_GI and M_C_EPI.

"M_C_GI" (FIG. 30):
M_C_GI (Motion picture Cell General Information) has the following basic information constituting a cell.

C_TY (Cell Type):
The following information for identifying a motion picture cell and a still picture cell are recorded in a format shown in FIG. 31.
C_TY1:
000b: Motion Picture (Movie) Cell
001b: Still Picture Cell
M_VOBI_SRPN (Movie VOB Information Search Pointer Number):
The search pointer number of movie VOB information to which this cell corresponds is recorded therein. In the case where access is to be given to stream data to which this cell corresponds, access is first given to a movie VOB information search pointer number indicated by this field.
C_EPI_Ns (Number of Cell Entry Point Information):
Number of entry point present in this cell is recorded therein.
C_V_S_PTM (Cell Video Start Time):
The reproducing start time of this cell is recorded in a format shown in FIG. 10.

C_V_E_PTM (Cell Video End Time):
The reproducing end time of this cell is recorded in the format shown in FIG. 10. The effective interval of this cell in the VOB to which this cell corresponds is specified by using the C_V_S_PTM and C_V_E_PTM.

"M_C_EPI" (FIG. 32):
M_C_EPI (Motion Picture Cell Entry Point Information) is classified into a type A and a type B depending on the presence of a primary text.

"M_C_EPI (Type A)" (FIG. 32):
M_C_EPI (Type A) comprises the following information indicative of an entry point.

EP_TY (Entry Point Type):
The following information for identifying the type of this entry point is recorded in accordance with a format shown in FIG. 33.
EP_TY1:
00b: Type A
01b: Type B
EP_PTM (Entry Point Time):
A time that the entry point is put is recorded in accordance with the format shown in FIG. 10.

"M_C_EPI (Type B)" (FIG. 32):
M_C_EPI (Type B) has the following PRM_TXTI in addition to the EP_TY and EP_PTM included in the type A.

PRM_TXTI (Primary Text Information):
Recorded therein is text information indicative of the contents of locations indicated by this entry point. The details are the same as in the above-mentioned PL_SRPT.

"S_CI" (FIG. 30):
S_CI (Still Picture Cell Information) comprises S_C_GI and S_C_EPI.

"S_C_GI" (FIG. 30):
S_C_GI (Still Picture Cell General Information) has the following basic information constituting a cell.

C_TY (Cell type):
Information for identifying a motion picture cell and a still picture cell are recorded. The details are the same as in the above-mentioned motion picture cell.
S_VOGI_SRPN (Still Picture VOB Group Information Search Pointer Number):
Recorded therein is the search pointer number of still picture VOB group information to which this cell corresponds. In the case where access is to be given to stream data to which this cell corresponds, access is first given to a still picture VOB group information search pointer number indicated by this field.
C_EPI_Ns (Number of Cell Entry Point Information):
Number of entry points present in this cell is recorded.
S_S_VOB_ENTN (Start Still Picture VOB Number):
The reproducing start still picture VOB number of this cell is recorded in the format shown in FIG. 11. The still picture VOB number is the order in the S_VOG indicated by the above-mentioned S_VOGI_SRPN.
E_S_VOB_ENTN (End Still Picture VOB Number):
The reproducing end still picture VOB number of this cell is recorded in the format shown in FIG. 11. The still picture VOB number is the order in the S_VOG indicated by the above-mentioned S_VOGI_SRPN. The effective interval of this cell in the S_VOG to which the cell corresponds is specified by using the S_S_VOB_ENTN and E_S_VOB_ENTN.

"S_C_EPI" (FIG. 32):
S_C_EPI (Still Picture Cell Entry Point Information) is classified into a type A and a type B depending on the presence of a primary text.

"S_C_EPI (Type A)" (FIG. 32):

S_C_EPI (Type A) comprises the following information indicative of an entry point.

EP_TY (Entry Point Type):

The following information for identifying the type of this entry point is recorded in accordance with a format shown in FIG. 33.

EP_TY1:

00b: Type A

01b: Type B

S_VOB_ENTN (Still Picture VOB Entry Number):

A number of still picture on which an entry point is put is recorded therein in accordance with the format shown in FIG. 11.

"S_C_EPI (Type B)" (FIG. 32):

S_C_EPI (Type B) has the following PRM_TXTI in addition to the EP_TY and S_VOB_ENTN included in S_C_EPI of type A.

PRM_TXTI (Primary Text Information):

Recorded therein is text information indicative of the contents of locations indicated by this entry point. The details are the same as in the above-mentioned PL_SRPT.

(Recording Date and Time Information)

Next, description will be given to a method for calculating recording date and time on a menu screen and a reproducing display screen from the above-mentioned data structure.

As described above, the recording date and time is recorded as the VOB_REC_TM (VOB recording time information) in the M_VOB_GI (movie VOB general information). This time indicates the date and time at which the head frame (in order of display) of the corresponding VOB is recorded. More specifically, the recording date and time for each frame in the VOB can be obtained by adding an elapsed time in the VOB to this value.

Figure 42:
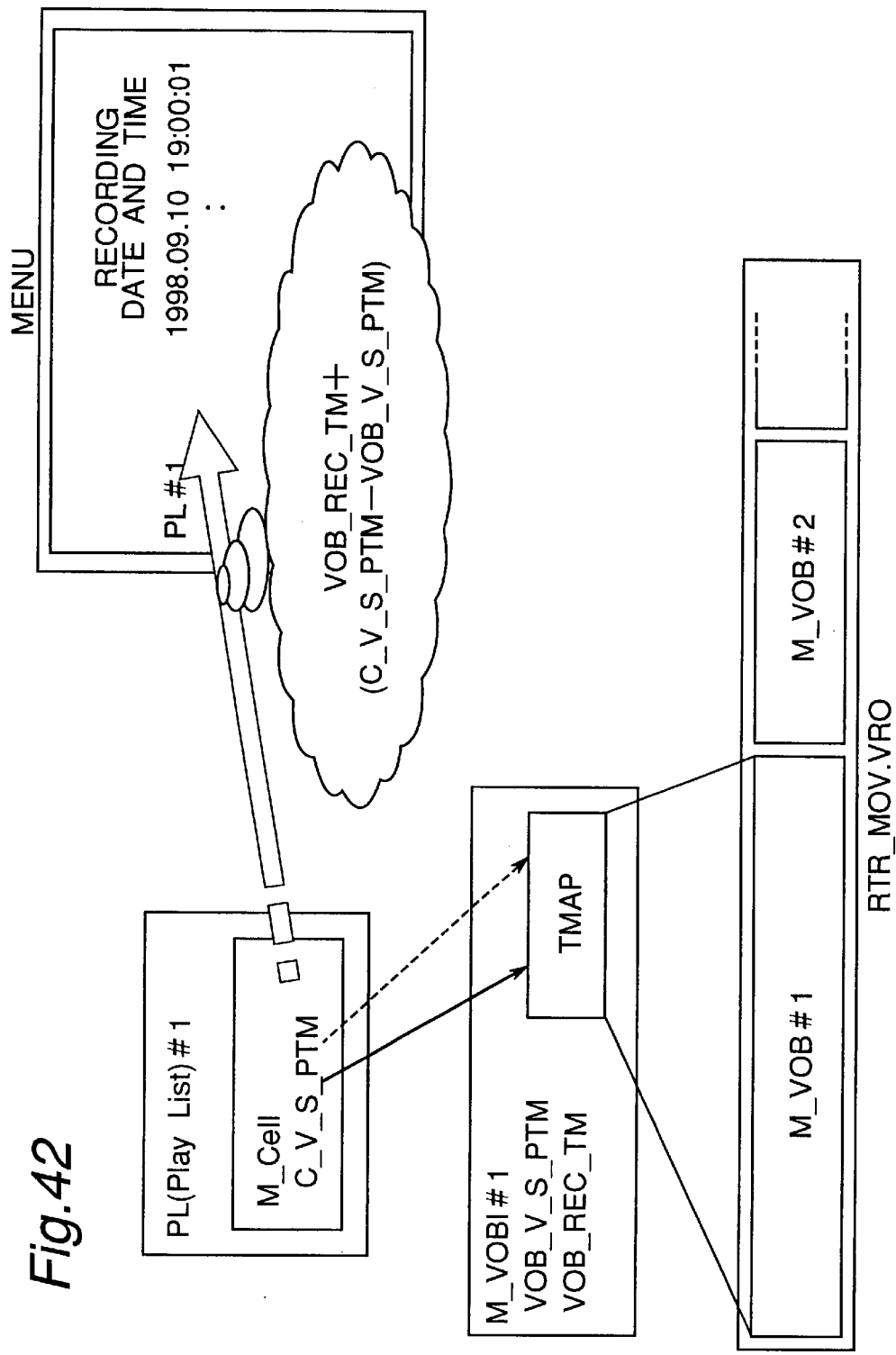
FIG. 42 is a diagram illustrating a method for generating a menu based on management information.

FIG. 42 shows an example of a recording date and time information displayed on the menu screen.

As described above, in the DVD-RAM, a program and a play list are put as a logical reproducing sequence that a user is conscious of over the AV data physically recorded. More specifically, the DVD recorder does not display on the menu screen a program list based on the VOB. But the recorder displays the program list based on the program and the play list, and the recording date information.

The recording time information is managed for each VOB. Therefore, the DVD recorder needs to know an elapsed time in the VOB and add the elapsed time to the VOB_REC_TM in order to obtain the recording time information on the head of each program and each play list. The elapsed time in the VOB of the head frame of the program and the play list can be obtained by using the following equation.

$$\text{elapsed time} = C\_V\_S\_PTM - VOB\_V\_S\_PTM \quad (1)$$

wherein C_V_S_PTM represents the reproducing start time information of the program or play list head Cell. By adding the elapsed time obtained by the equation (1) to the VOB_REC_TM which is the recording time information of the VOB corresponding to the Cell, the recording time information of the program or the play list can be obtained.

Figure 43:
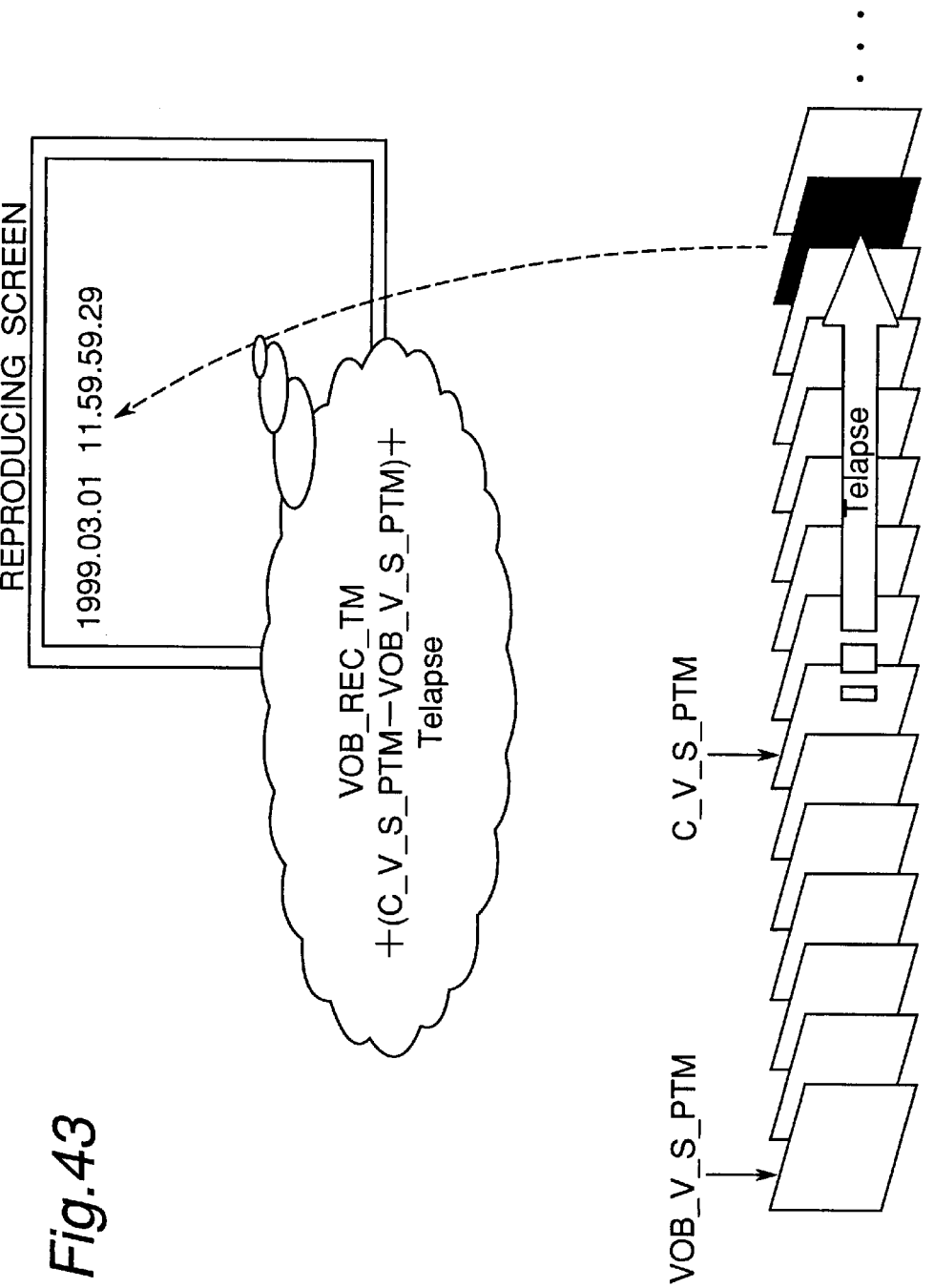
FIG. 43 is a diagram illustrating a method for generating recording date information during reproduction.

Next, an example of the recording time information displayed on the reproducing display screen will be described with reference to FIG. 43.

To obtain the recording time information displayed on the screen during reproduction operation, it is necessary to take a further elapsed time on the reproduction into consideration. Since as described above, the elapsed time from the VOB head to the Cell head can be obtained by the equation (1), an elapsed time (Telapse) from the Cell head may be counted during the reproduction.

(Structure of DVD Recorder)

Figure 44:
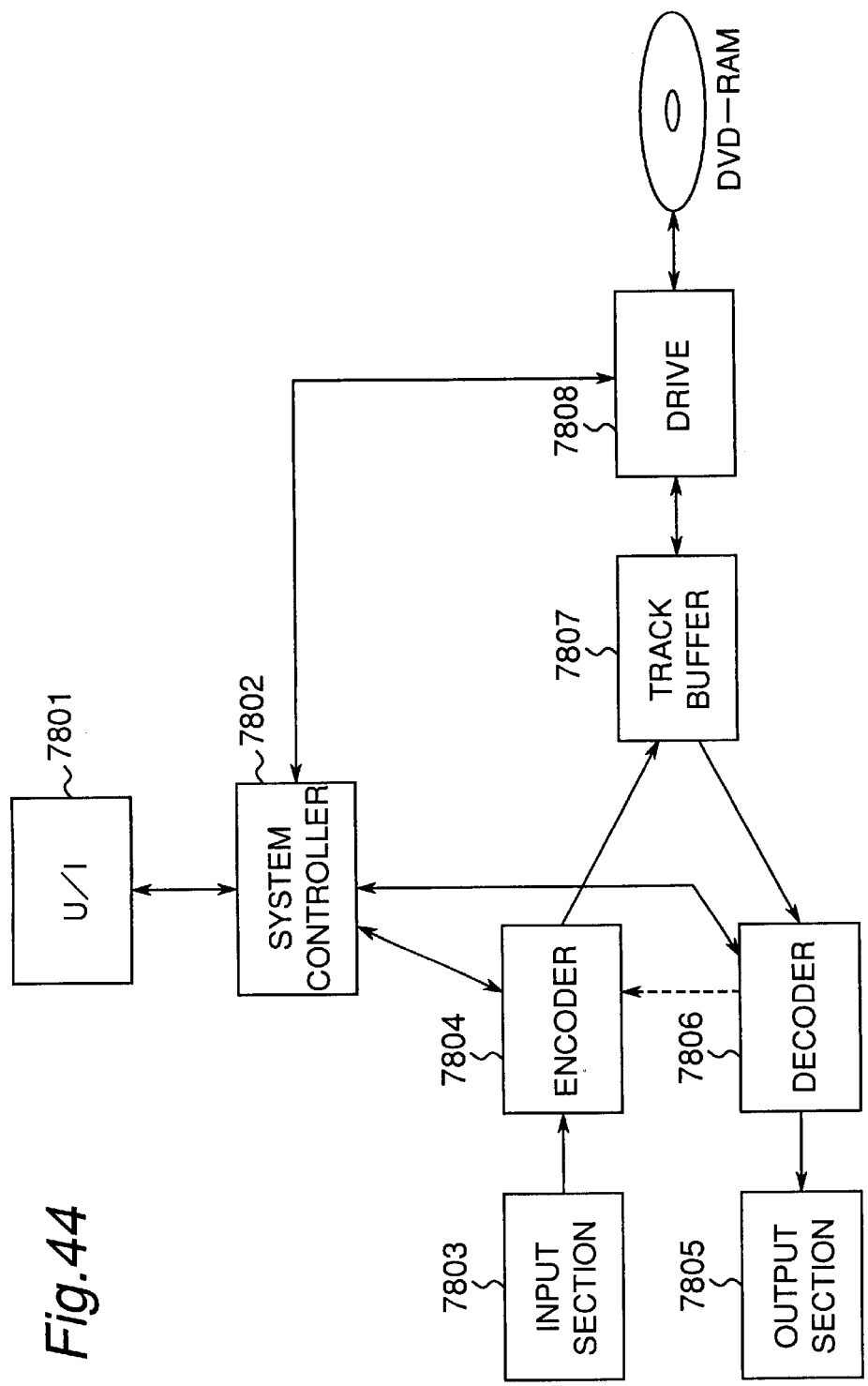
FIG. 44 is a diagram showing the structure of the DVD recorder.

Next, the structure of the DVD recorder will be described with reference to FIG. 44.

In the drawing, the DVD recorder comprises a user interface 7801, a system controller 7802, an input section 7803, an encoder 7804, an output section 7805, a decoder 7806, a track buffer 7807 and a drive 7808. The user interface 7801 accepts a display for the user and the user's request. The system controller 7802 has a clock and serves to wholly carry out management and control. The input section 7803 includes an AD converter for receiving video and audio signal. The output section 7805 outputs video and audio data. The decoder 7806 decodes an MPEG stream.

(Recording Operation of DVD Recorder)

Next, the recording operation of the DVD recorder will be described below.

Figure 37:
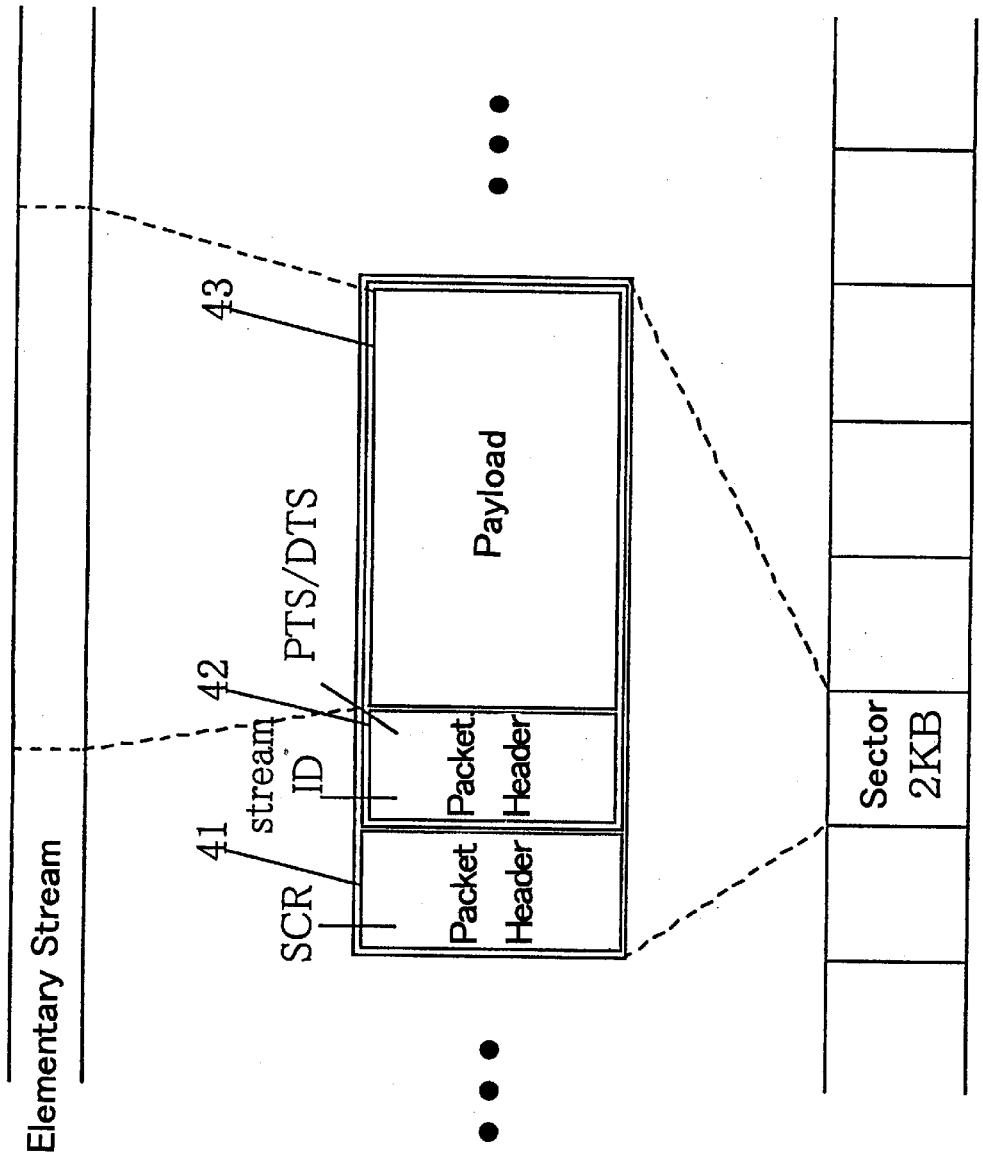
FIG. 37 is a diagram showing the structure of an MPEG system stream.
Figure 38:
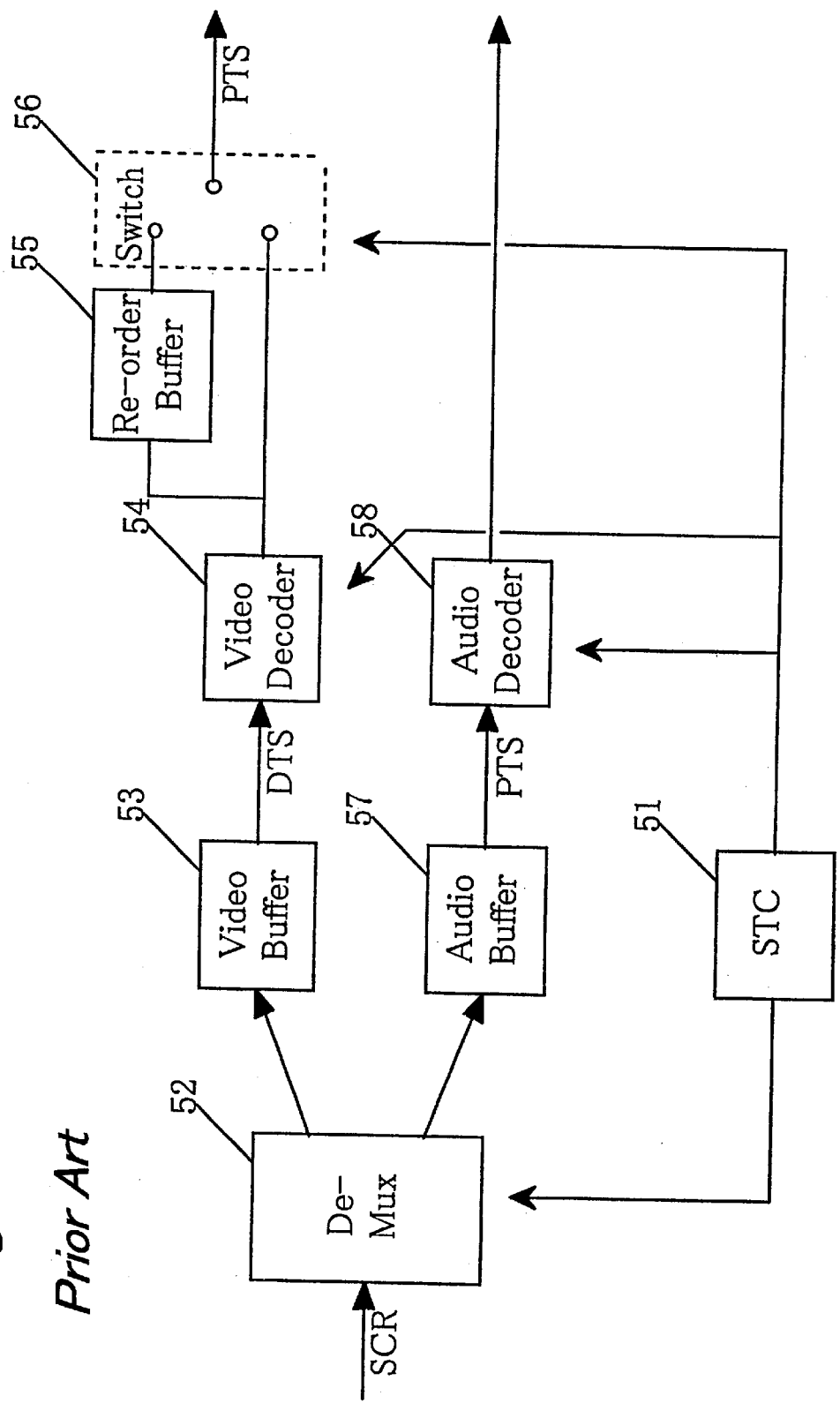
FIG. 38 is a diagram showing the structure of an MPEG system decoder (P-STD).
Figure 40:
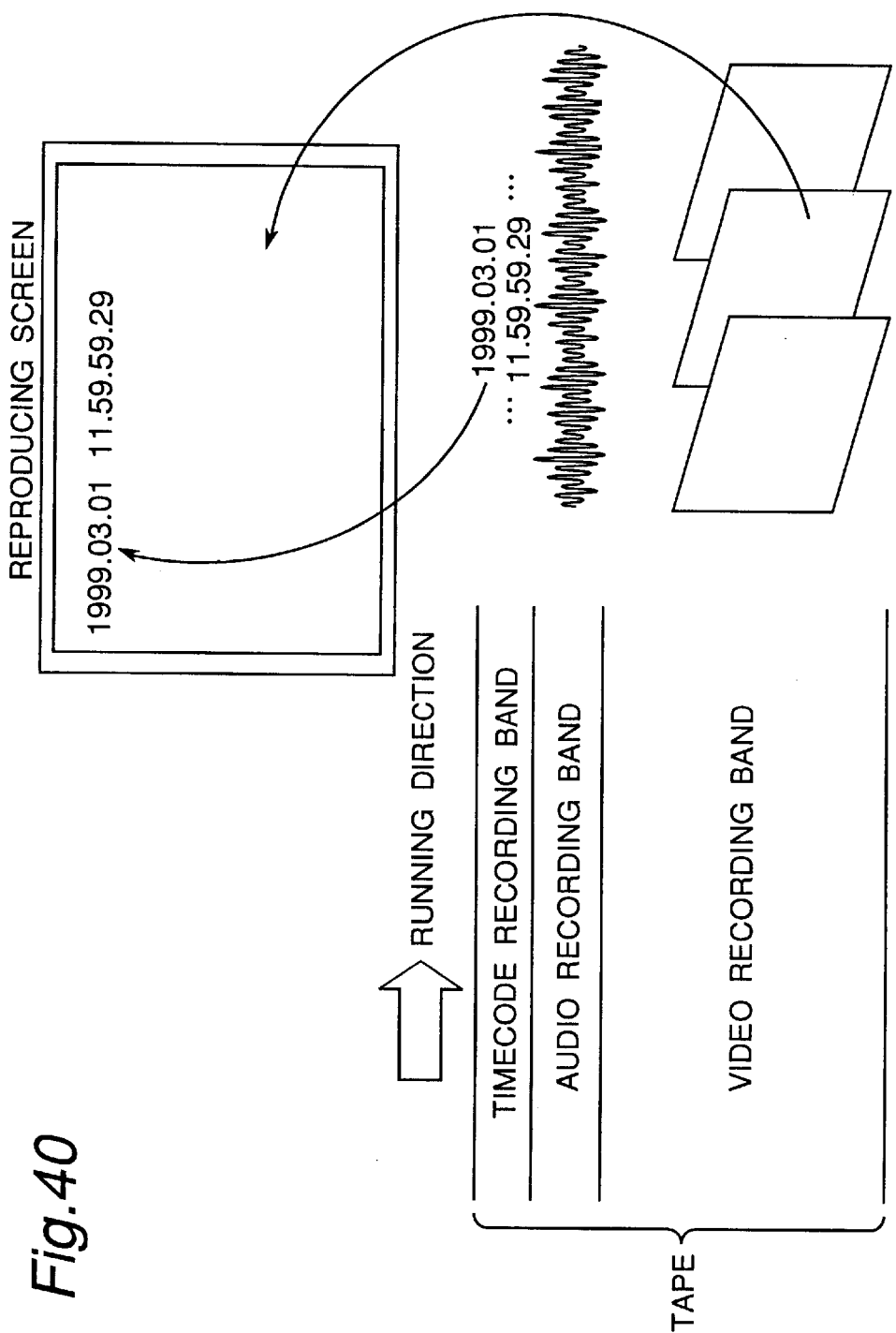
FIG. 40 is a diagram showing the structure of a recording band on a tape.
Figure 41:
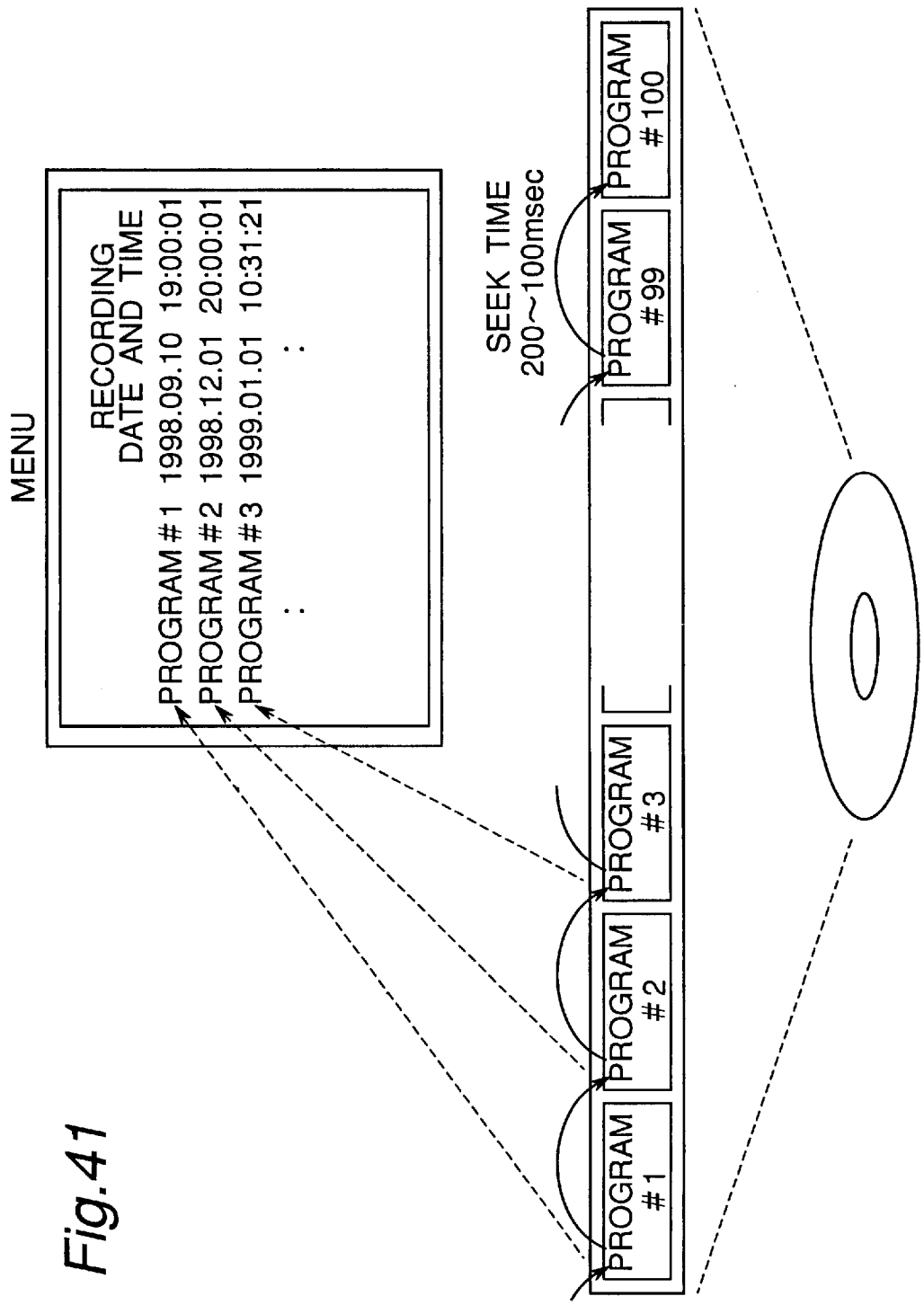
FIG. 41 is a diagram illustrating a method for generating a menu from stream data.

When receiving a request of the program recording from the user through the user interface 7801, the system controller 7802 notifies the encoder 7804 of an encode start request The encoder 7804 performs video encoding and audio encoding the video and audio signal sent from the input section 7803, and multiplexes AV data and supplies the data as the MPEG system stream (VOB) shown in FIG. 37 to the track buffer 7807.

At the same time, the system controller 7802 sends the drive 7808 a writing request to the DVD-RAM. The drive 7808 fetches the data stored in the track buffer 7807 and writes the same data to the DVD-RAM. Moreover, the system controller 7802 fetches date and time information from an internal clock and temporarily stores the date and time information in the internal memory simultaneously with the start of picture recording.

When the user requests to stop recording or a recording end time set by the user comes, the system controller 7802 receives a recording stop request through the user interface 7801.

The system controller 7802 notifies the encoder 7804 of the recording stop request. The encoder 7804 stops an encode processing. Moreover, the encoder section 7804 returns pack number information including the size of each VOBU, a reproducing interval and the head I picture to the system controller 7802 at the same time as the end of encode processing. The system controller 7802 generates a time map based on the VOBU information received from the encoder 7804.

Next, the system controller 7802 notifies the drive 7808 of a writing stop request. The drive 7808 ends the writing processing when the operation for writing data remaining in the track buffer 7807 to the DVD-RAM is terminated, and notifies the system controller 7802 of the end.

When the process of the encoder 7804 and the drive 7808 are terminated, the system controller 7802 generates management information VOBI of the recorded VOB, and registers the same management information VOBI on the M_AVFIT (motion picture AV file information table). Moreover, corresponding PGI (program information) and M_CI (motion picture cell information) are generated and registered to ORG_PGCI (original PGC information). Furthermore, the system controller 7802 records the date information which has been fetched and recorded in the internal memory to VOB_REC_TM of the VOB in the M_VOBI (dynamic VOB information) as the recording time information.

(Reproducing Operation of DVD Recorder)

Next, the reproducing operation of the DVD recorder will be described.

When the user inserts the DVD-RAM into the drive 7808, the drive 7808 notifies the system controller 7802 of the insertion of DVD-RAM. Then the system controller 7802 reads the management information file "RTR.IFO" recorded in the DVD-RAM through the drive 7808 and stores the management information file in the internal memory.

Next, the system controller 7802 notifies the user of the program information recorded in the DVD-RAM by a menu display through the user interface 7801. As shown in FIG. 42, the menu includes a program number or a play list number, and the recording time information of a program or a play list. The recording date and time information can be calculated by adding the elapsed time in the VOB obtained as described above to VOB_REC_TM.

The user selects a desired program from the menu and sends an instruction to the user interface 7801, thereby notifying the system controller 7802 of the selected program through the user interface section 7801.

The system controller 7802 obtains a reproducing start address from the head M_CI (motion picture cell information) of the program or play list which is specified by the user and the M_VOBI (movie VOB information) corresponding to this cell to send a request to read the AV data from this address to the drive 7808. When receiving the request, the drive 7808 reads data from the specified address on the DVD-RAM and stores the read data in the track buffer 7807.

The system controller 7802 gives a decode start request to the decoder 7806. The decoder 7806 fetches the data stored in the track buffer 7807 and performs a decode processing, thereby reproducing a video and audio data through the output section 7805.

Furthermore, the system controller 7802 adds the reproducing elapsed time (Telapse) that is counted up for each frame to the recording time information of the cell head to obtain the recording time information for each frame, and notifies the decoder 7806 of the obtained recording date and time information. The decoder 7806 synthesizes the received recording date and time information with the decoded video data, and outputs the synthesized data through the output section 7805.

(Edit of VOB Data)

Next, the case where the VOB data are edited will be described.

Figure 16:
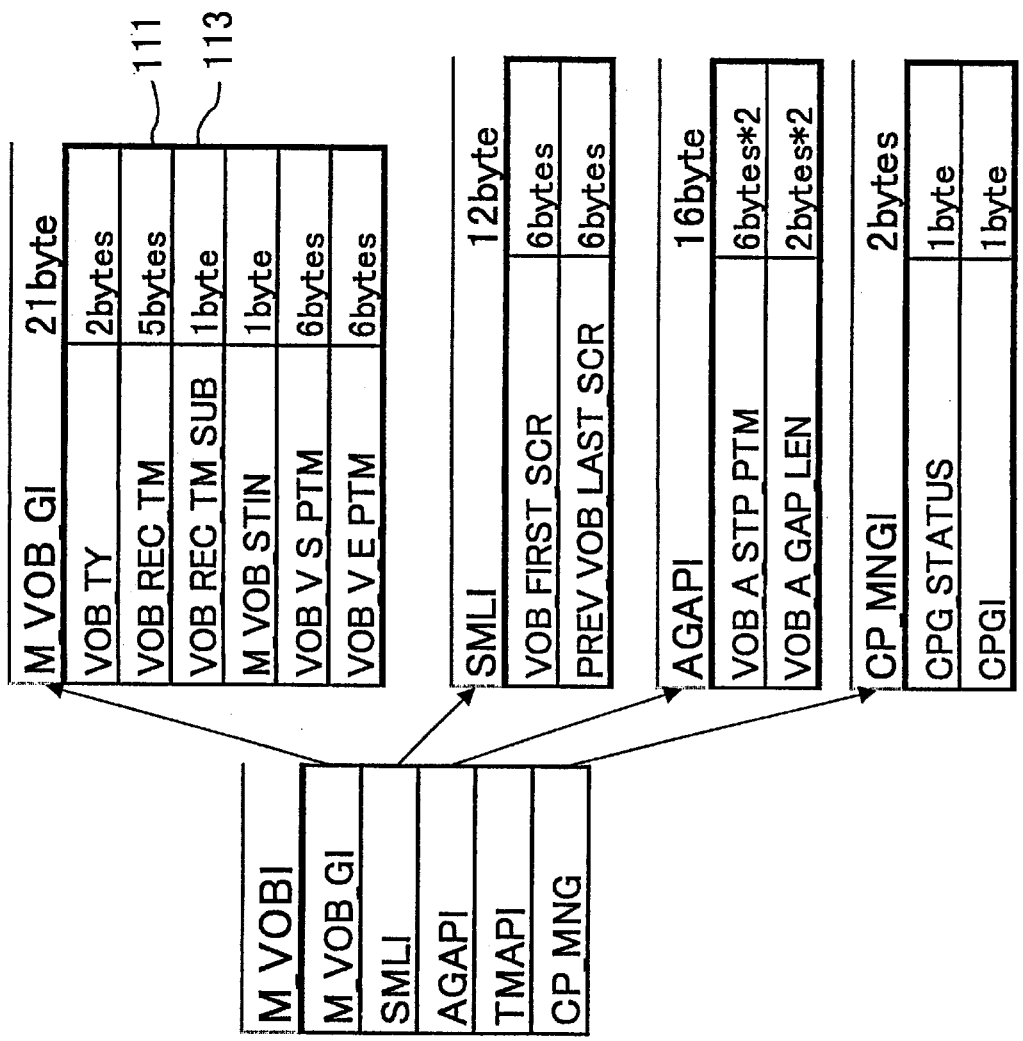
FIG. 16 is a diagram showing the structure of M_VOBI.
Figure 18:
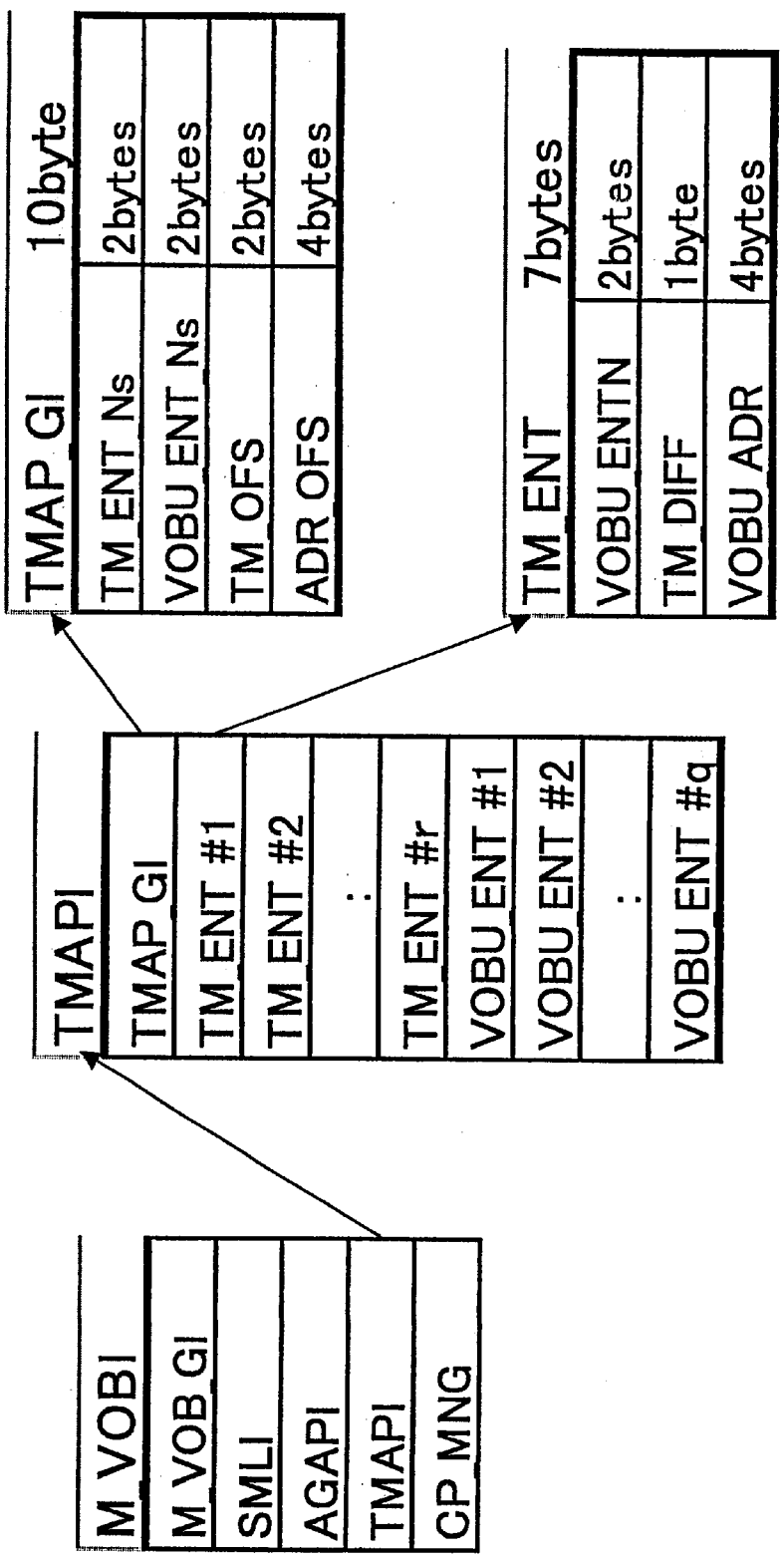
FIG. 18 is a diagram showing the structure of TMAPI.
Figure 20:
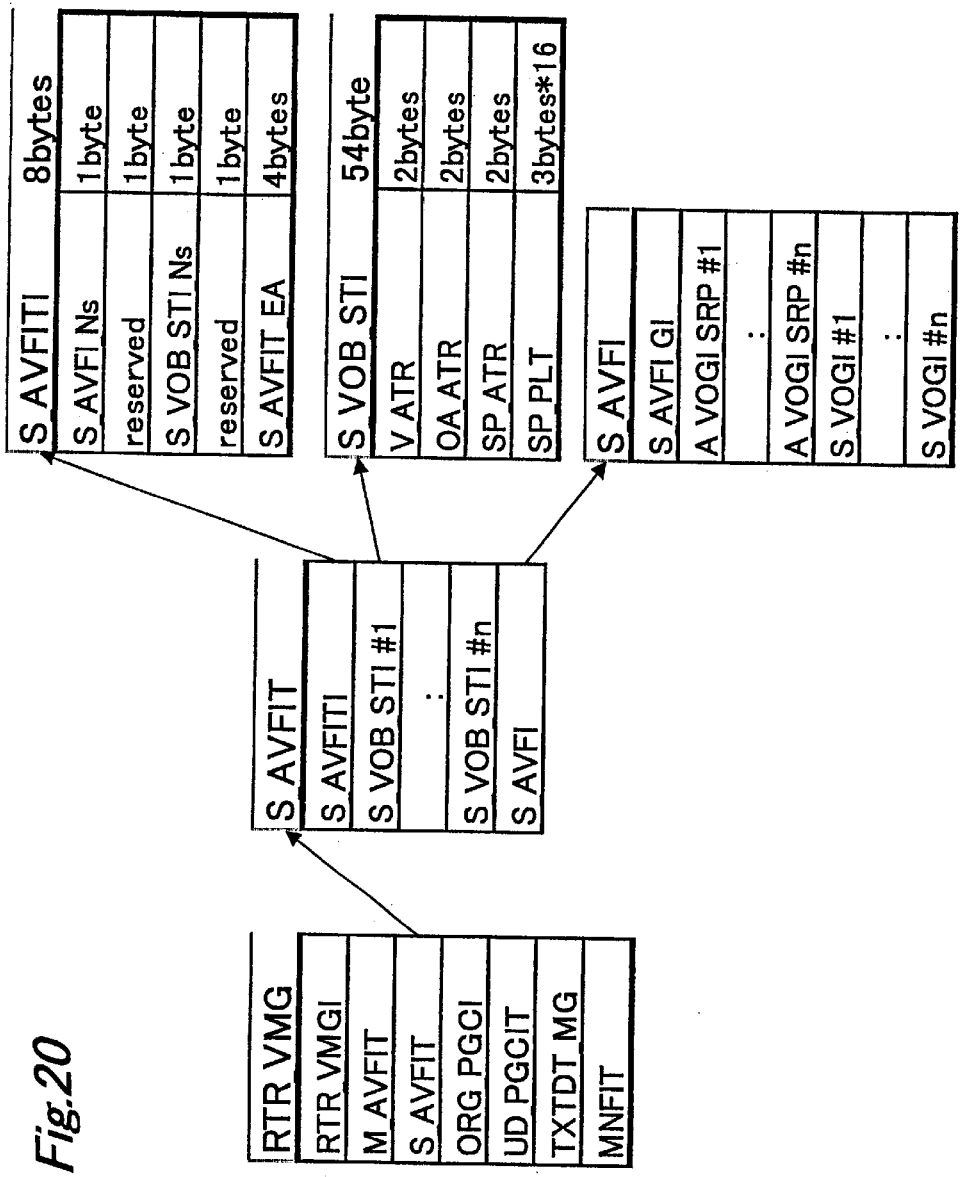
FIG. 20 is a diagram showing the structure of S_AVFIT.
Figure 23:
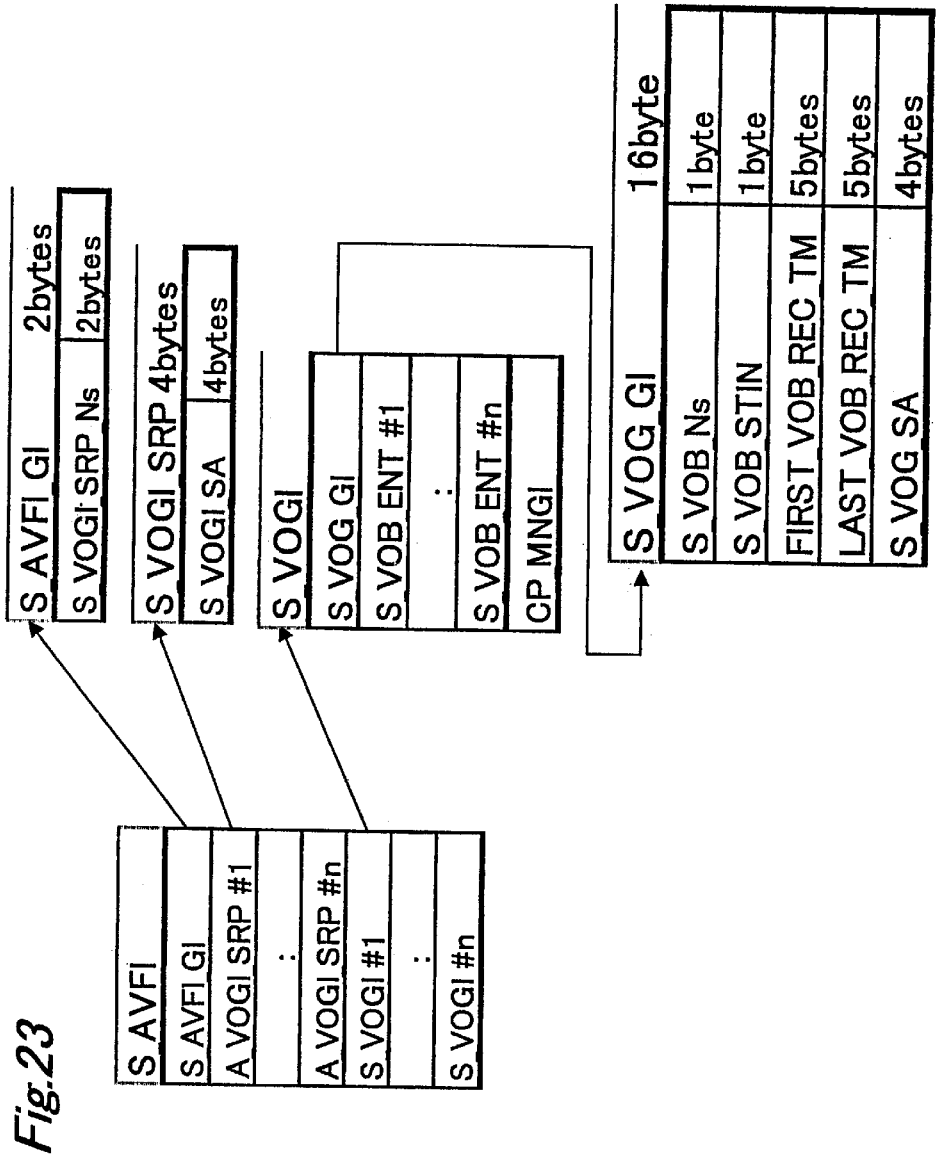
FIG. 23 is a diagram showing the structure of S_AVFI.
Figure 26:
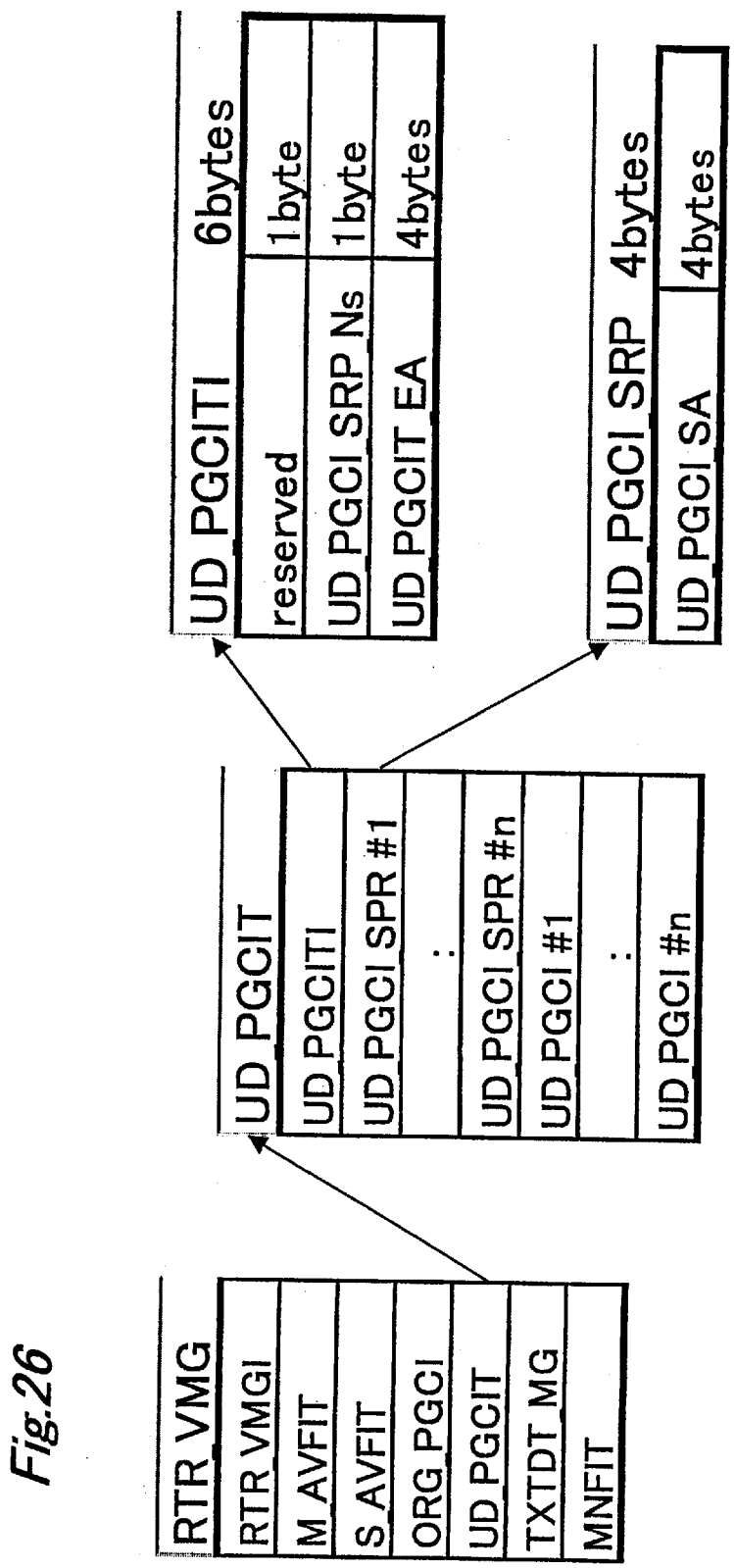
FIG. 26 is a diagram showing the structure of UD_PGCIT.
Figure 27:
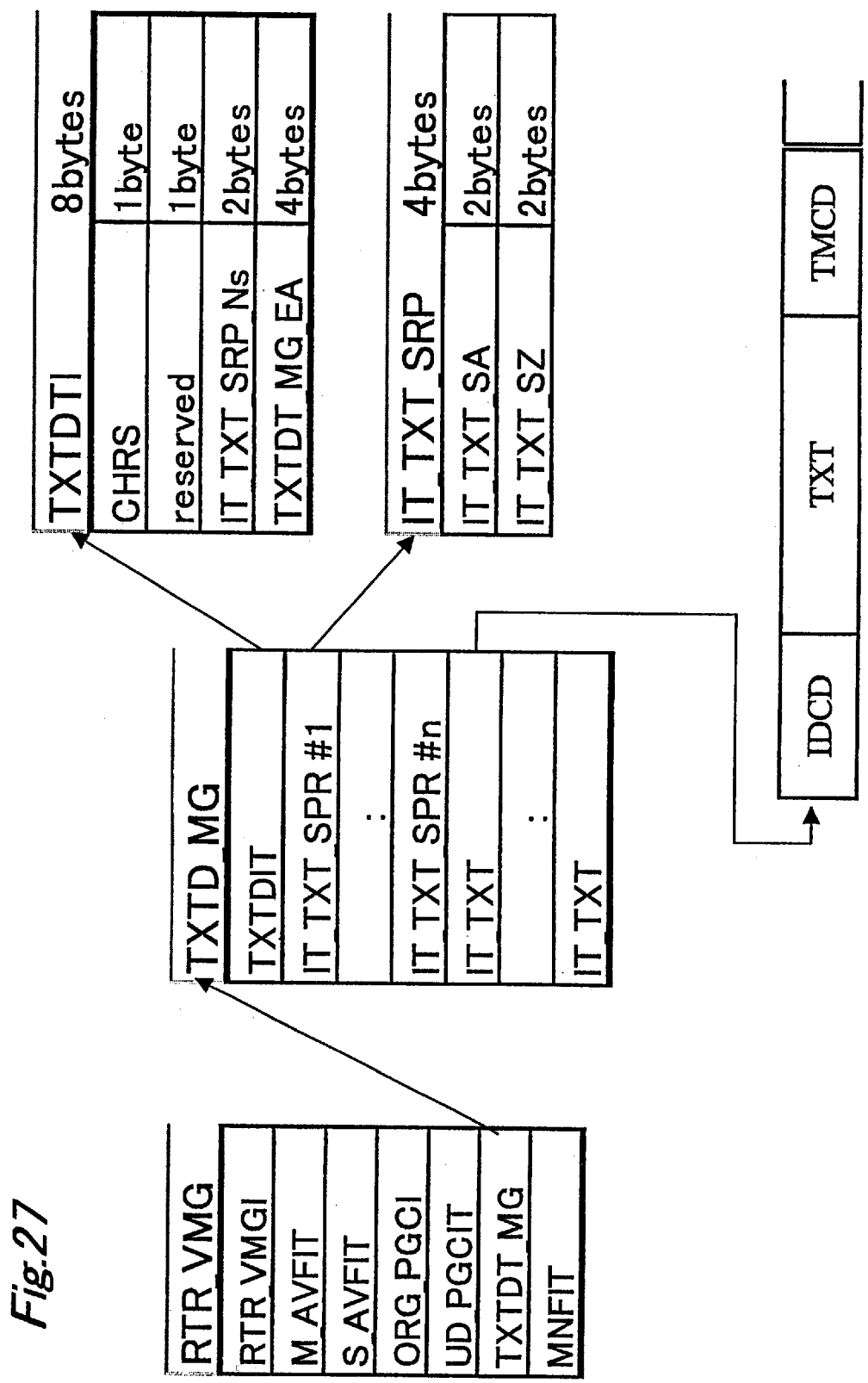
FIG. 27 is a diagram showing the structure of TXTDT_MG.
Figure 28:
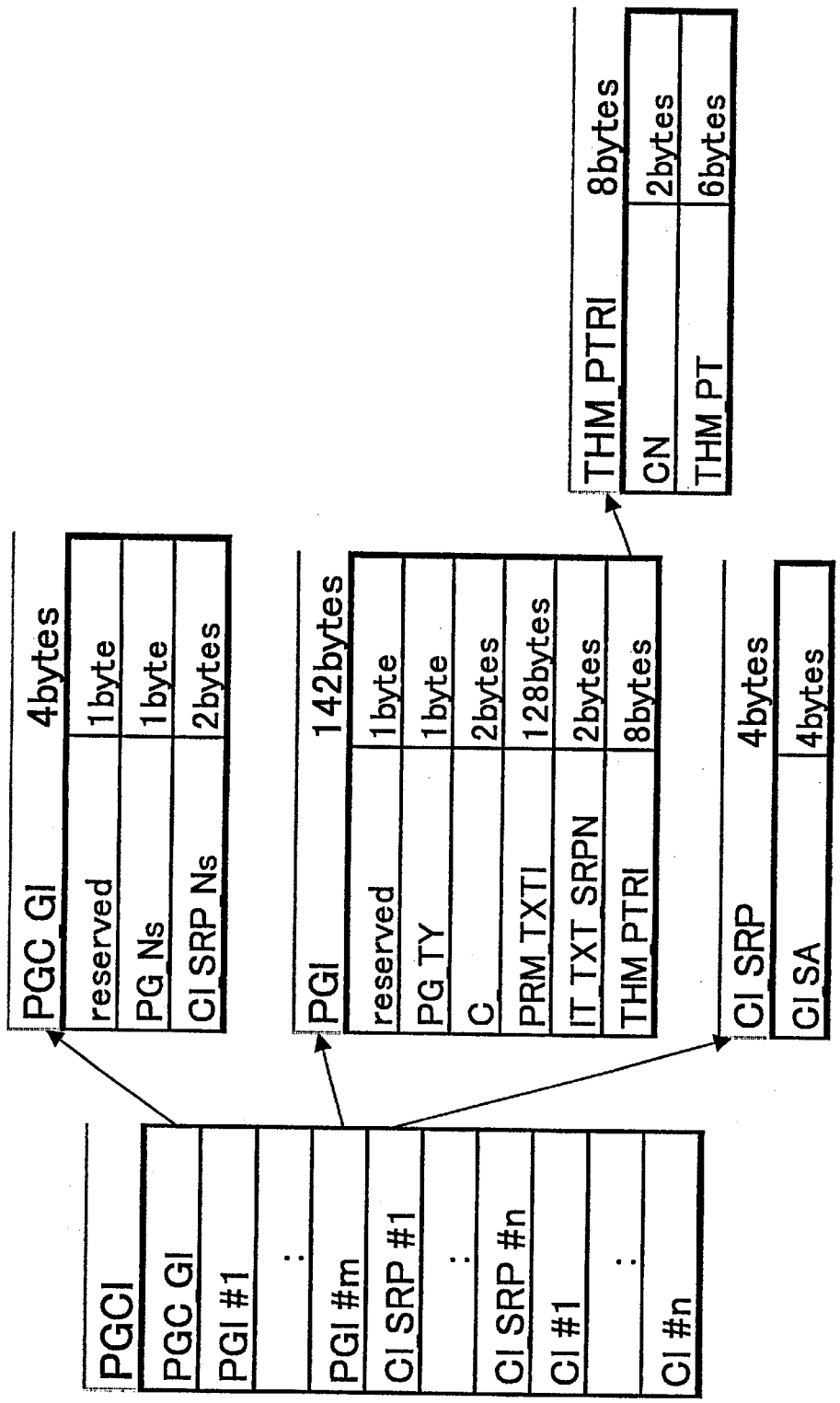
FIG. 28 is a diagram showing the structure of PGCI.
Figure 30:
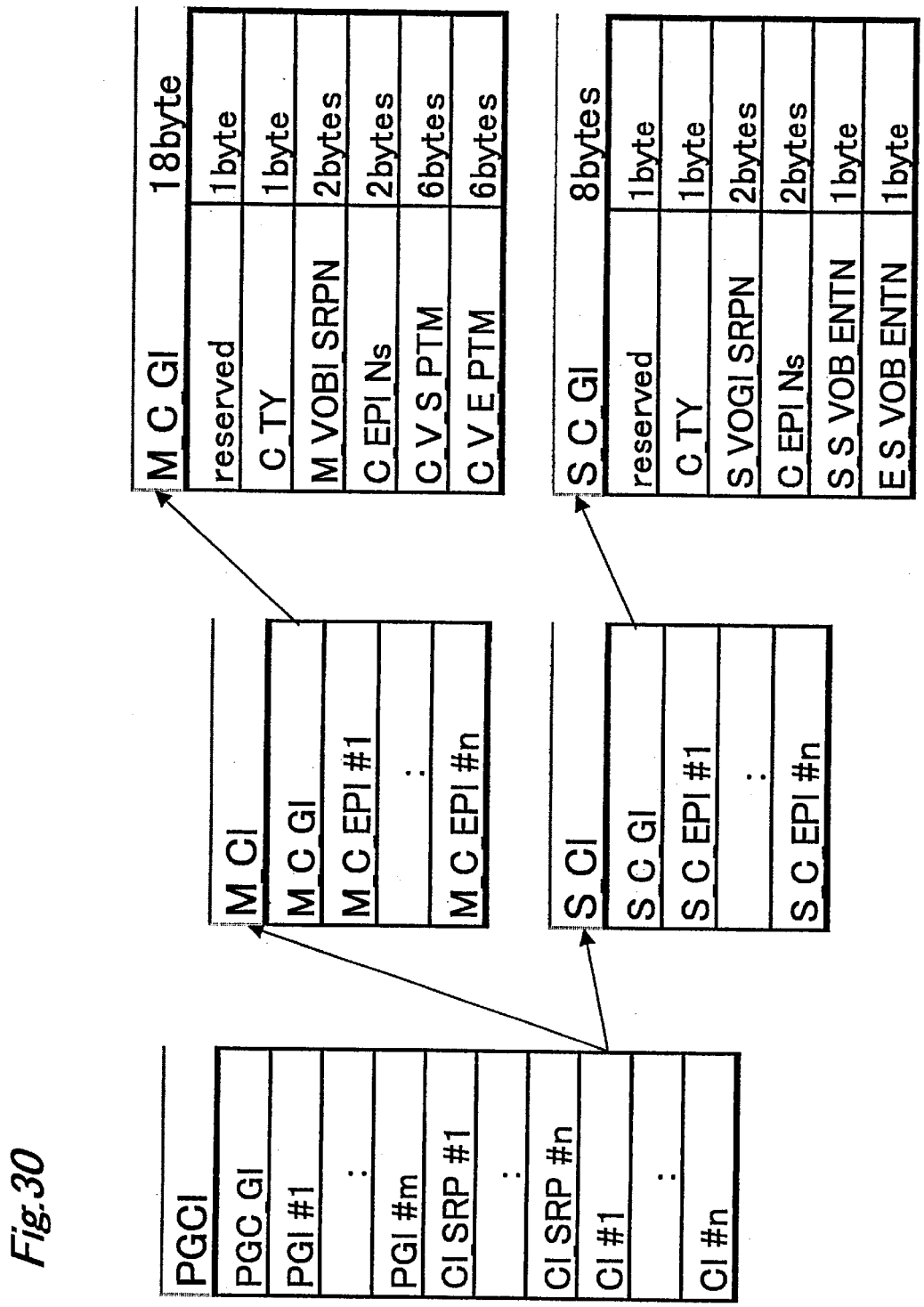
FIG. 30 is a diagram showing the structure of CI.
Figure 34:
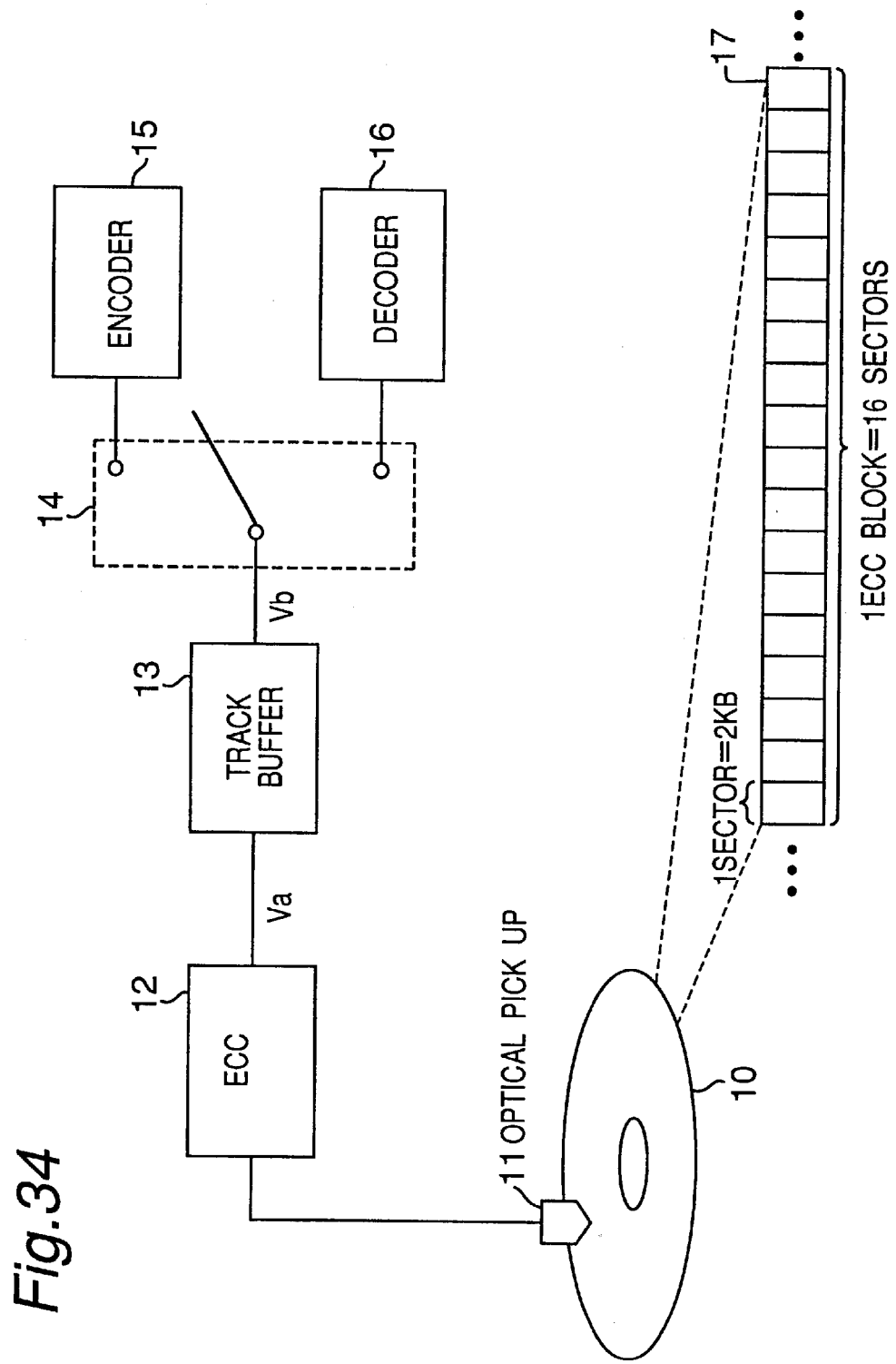
FIG. 34 is a block diagram showing the drive device of a DVD recorder.
Figure 36:
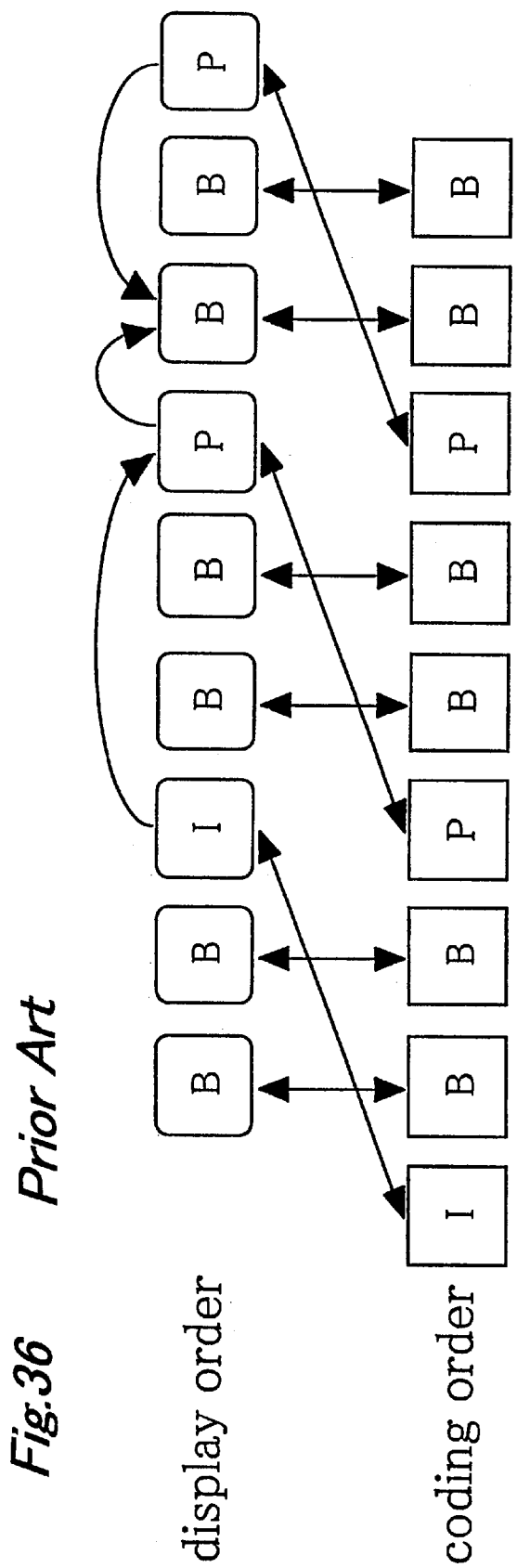
FIG. 36 is a picture correlation diagram in an MPEG video stream.

As described with reference to FIG. 16, the recording time information VOB_REC_TM of the VOB has information represented by year, month, day, hour, minute and second. There is no problem as long as the recording and reproduction of the VOB and deletion in a VOB unit are repeated. However, if a part of the VOB is deleted, the following problems arise.

For example, when the first 10 seconds and 58 fields (29 frames) of the VOB are deleted, the VOB_REC_TM should add the 10 seconds and 58 fields in respect of VOB_REC_TM indicating the recording date and time of the VOB head frame. At this time, the VOB_REC_TM cannot perform recording with a frame (field) precision. Therefore, the VOB_REC_TM adds only 10 seconds without fraction of 58 fields (29 frames). If the original VOB_REC_TM is "09:00:00, Mar. 1st, 1999", it becomes "09:00:10, Mar. 1st, 1999" after the execution of partial deletion. Consequently, an error of 58 fields (29 frames) is made. This error is accumulated by repetition of the partial deletion processing. For example, if the partial deletion for 10 seconds and 58 fields (29 frames) described above is carried out 100 times, an error of 5800 (=100×58) fields (approximately 96 seconds) is accumulated.

Accordingly, the error generated by editing is recorded in the VOB_REC_TM_SUB (VOB recording date difference information) in the M_VOBI (movie VOB information).

The following relationship is formed before and after the partial deletion of the VOB head.

$$VOB\_REC\_TM \text{ before the partial deletion} + VOB\_REC\_TM\_SUB \text{ before the partial deletion} - \text{partial deletion time} = VOB\_REC\_TM \text{ after the partial deletion} + VOB\_REC\_TM\_SUB \text{ after the partial deletion} \quad (2)$$

Figure 45:
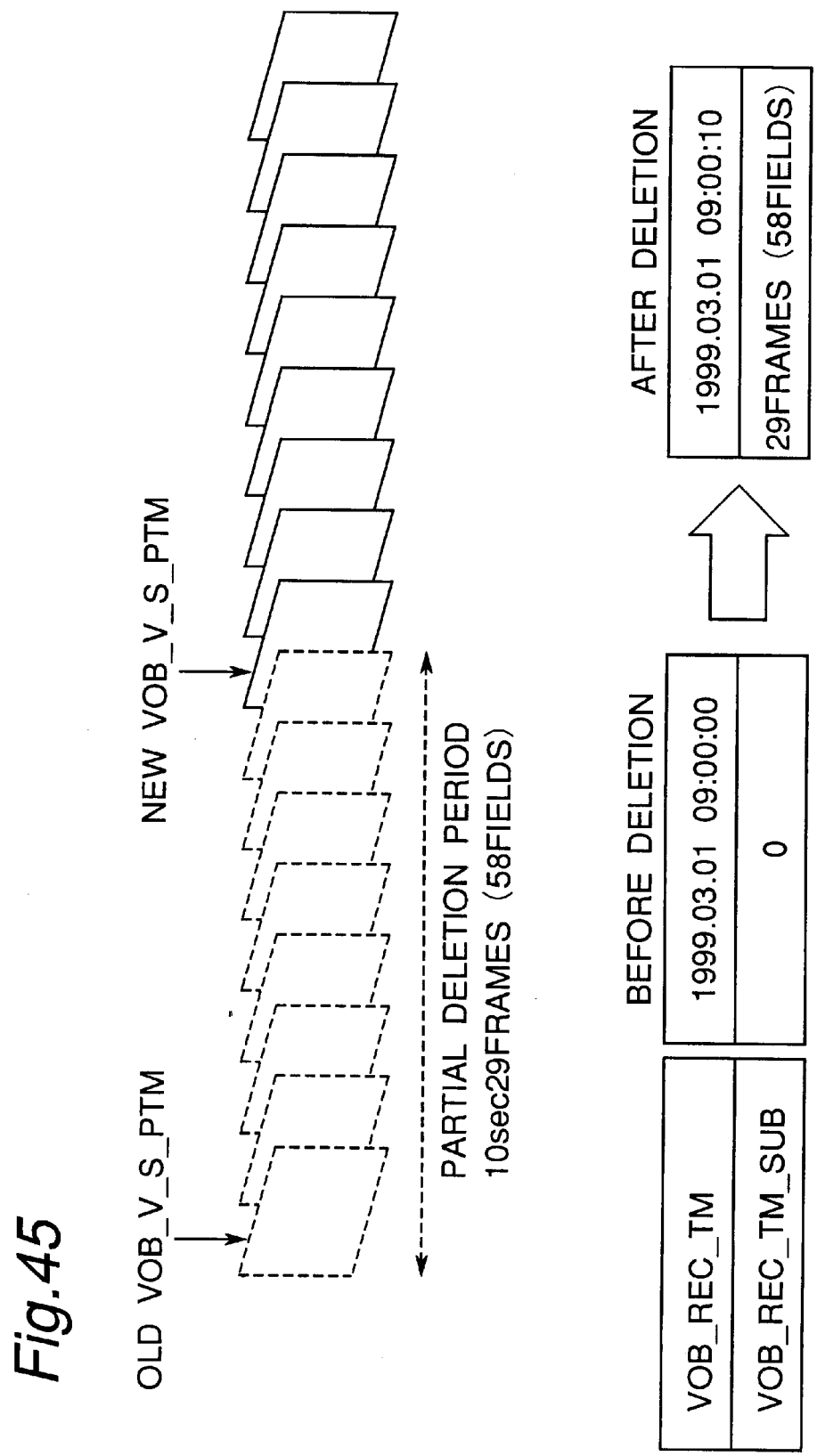
FIG. 45 is a diagram illustrating a method for modifying recording date information during edit.

For example, as shown in FIG. 45, when VOB_REC_TM before the partial deletion is "09:00:00, Mar. 1st, 1999" and time or period to be deleted of VOB is 10 seconds and 58 fields (29 frames), VOB_REC_TM after the deletion stores "09:00:10, Mar. 1st, 1999" and VOB_REC_TM_SUB stores "58 fields (29 frames)".

It is noted that VOB_REC_TM_SUB may store error information in each frame, or error information represented by time stamp.

(Partial Deletion Operation)

The operation of partial deletion will be described below with reference to FIGS. 46 to 48.

Figure 46:
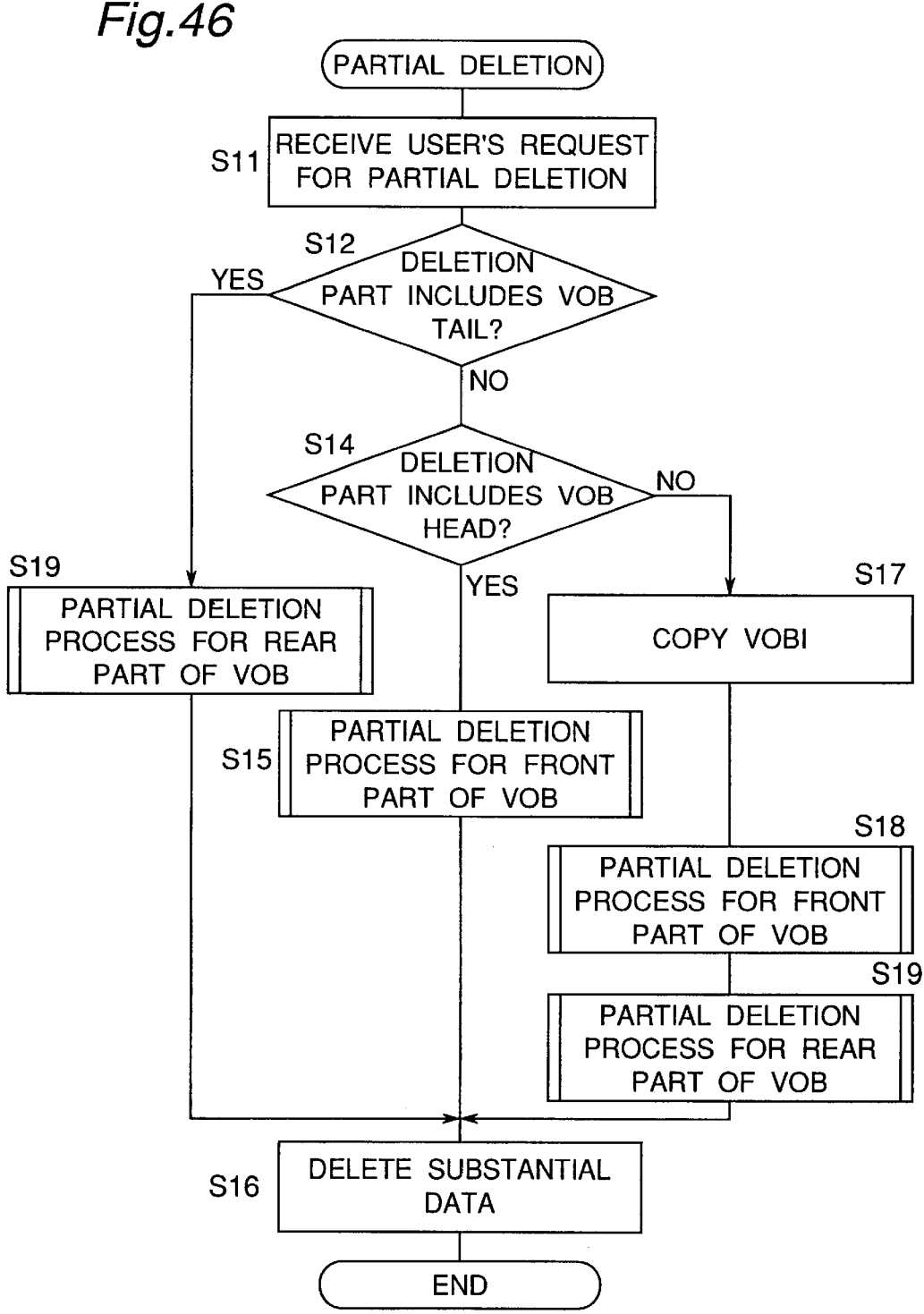
FIG. 46 is a flowchart of partial deletion operation.

As shown FIG. 46, the system controller 7802 receives the request to delete a part of VOB from user through the user interface 7801 (S11). The user's request includes start position of deletion and period of deletion. It is determined whether the part to be deleted includes a tail of VOB in accordance with the request (S12).

Figure 49A:
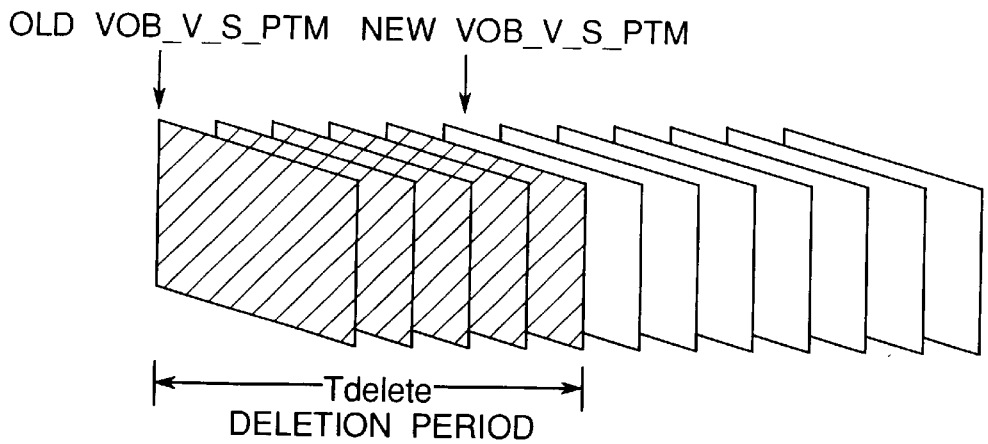
FIG. 49A is a diagram illustrating partial deletion of portion including a header of VOB.

When the part to be deleted includes the tail of VOB (see FIG. 49C), deletion process for a rear part of VOB is performed (S13).

When the part to be deleted does not include the tail of VOB, It is determined whether the part to be deleted includes the head of VOB (S14). When the part to be deleted includes a head of VOB (see FIG. 49A), deletion process for a front part of VOB is performed (S15).

When the part to be deleted includes the head of VOB (see FIG. 49B), VOBI corresponding to VOB designated by the user is duplicated (S17). The reason why VOBI is duplicated is that in the case of FIG. 49B the partial deletion divides VOB into two parts and thus it needs to obtain VOBI used to a new VOB generated by the partial deletion. Then the deletion process for a rear part of VOB is performed to the rear VOB newly generated by the partial deletion (S18). The deletion process for a front part of VOB is performed to the front VOB newly generated by the deletion (S19).

After the deletion process for a front part of VOB, the deletion process for a rear part of VOB or both of them is completed, the substantial VOB data is deleted (S16).

The deletion process for a rear part of VOB in steps S13 and S19 is carried out as follows.

Figure 47:
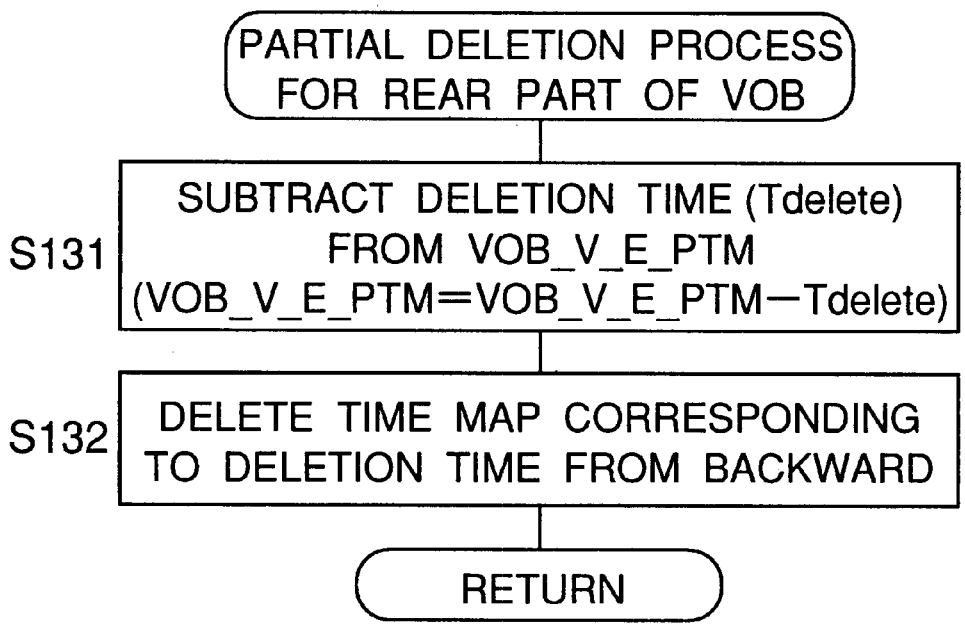
FIG. 47 is a flowchart of deletion operation of the rear part of VOB in the partial deletion operation.
Figure 49B:
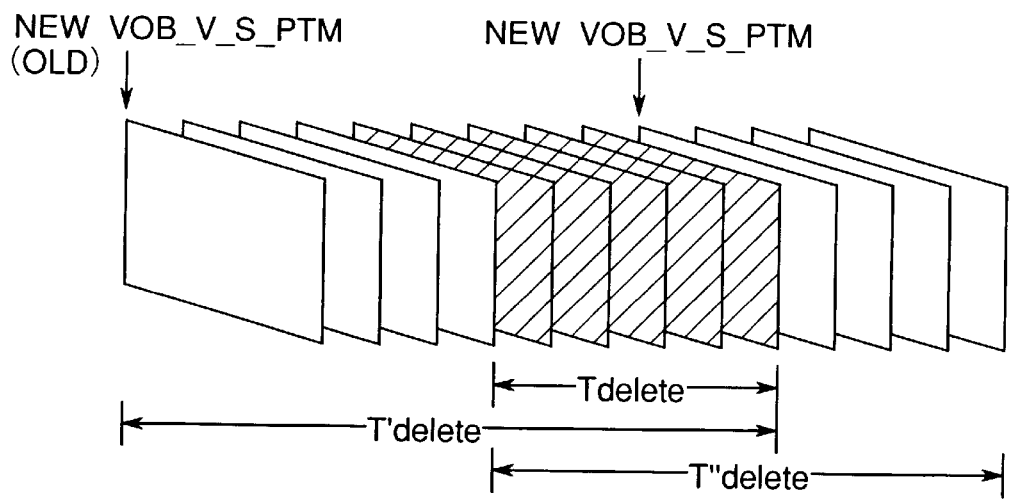
FIG. 49B is a diagram illustrating partial deletion of middle portion of VOB.
Figure 49C:
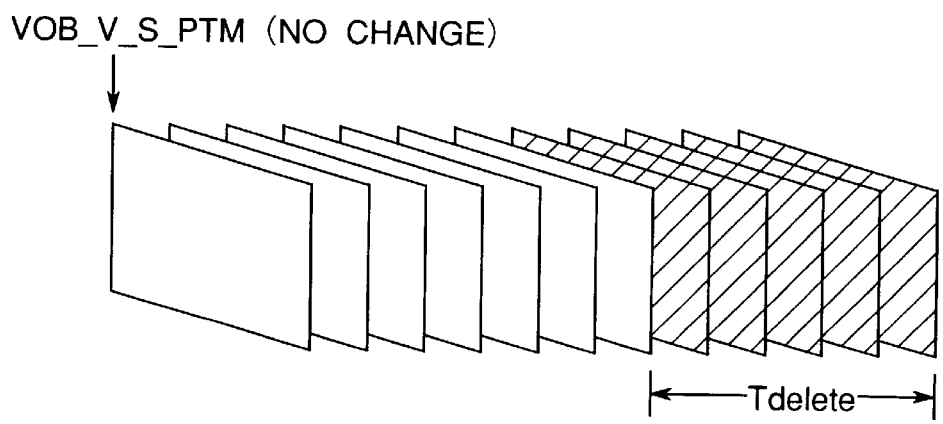
FIG. 49C is a diagram illustrating partial deletion of portion including a tail of VOB.

Referring to FIG. 47, VOB presentation end time (VOB_V_E_PTM) is subtracted by deletion time (Tdelete) (S131). It is noted that in the case as shown in FIG. 49B, a time T"delete which is measured from a tail of VOB before deletion is used as the deletion time (Tdelete). Then time map corresponding to the deletion time (Tdelete) is deleted from backward (S132). It is noted that deleting operation of time map is disclosed in EP0926903A1.

The deletion process for a front part of VOB in steps S15 and S18 is carried out as follows.

Referring to FIG. 48, the deletion time (Tdelete) is added to VOB presentation start time (VOB_V_S_PTM) (S151). It is noted that in the case as shown in FIG. 49B, a time T'delete which is measured from a head of VOB before deletion is used as the deletion time (Tdelete). Subsequently the edit process is carried out to update the VOB_REC_TM and VOB_REC_TM_SUB (S152–S156).

Concretely, the residue obtained by dividing deletion time Tdelete by 60 fields (=1 second) is added to VOB_REC_TM_SUB (S152). It is determined whether the value of VOB_REC_TM_SUB is equal to or more than 60 fields (=1 second) (S153). When the value of VOB_REC_TM_SUB is equal to or more than 60 fields, VOB_REC_TM_SUB is subtracted by 60 fields (S154), and VOB_REC_TM_SUB is added by 1 second (S155). By shifting the value of VOB_REC_TM_SUB by 60 fields, VOB_REC_TM_SUB stores error of a recording start date and time that is less than 1 second. Then VOB_REC_TM is added by deletion time (Tdelete) represented in year, month, day, hour, minute and second (S156). Then time map corresponding to the deletion time (Tdelete) is deleted from forward (S157). In the above description, 1 second is treated as 60 fields in the case of NTSC format employed in Japan and USA. A number of fields for one second is dependent on TV format, in the case of PAL format of European standard, 1 second is treated as 50 fields.

As described above DVD-RAM in this embodiment stores recording date and time information for video data in the management file. Thus it is possible to display quickly a menu screen on reproduction with reference to the recording time information. The DVD-RAM also has error information in addition to the recording time information. Therefore modification of the recording time information is performed accurately when the edit operation such as partial deletion is performed.

While the recorder for the DVD-RAM has been described in the present embodiment, the present invention is not restricted to the DVD-RAM but can be applied to any writable disc.

In the above description of the present embodiment, the recording date and time displayed on the menu is obtained at the head of the program, that is, at the head video frame of the head Cell. However, the date and time may be obtained at a predetermined optional video frame (for example, 10 seconds later frame from the head frame).

The recording date and time information displayed in the middle of reproduction has been obtained by adding a elapsed time passed from the Cell head to the data and time of cell head in the above description of the present embodiment. However, it can be obtained by adding the recording time information on each VOBU head that is calculated based on the VOBU_ENT (VOBU entry) in the M_VOBI (movie VOB information) to the elapsed time in the VOBU.

Moreover, the recording time information to be displayed during the reproducing operation is displayed not for each frame but in only a time obtained by the above-mentioned calculation based on the VOBU_ENT.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An apparatus for recording data onto a recording medium comprising: video data; and management information including a recording time information indicative of date and time at which the video data is recorded, wherein the recording time information comprises a main time information including information of recording date and time of the video data represented by year, month, day, hour, minute and second, and an error time information including fraction time of the recording date and time of the video data that is less than one second, and wherein a video image represented by the video data comprises a plurality of video frames and wherein the recording time information indicates date and time at which a head video frame of the plurality of video frames is recorded, said apparatus comprising:

a receiving unit for receiving a request to delete a part of the video image from a user; and an updating unit for updating the recording time information when the part of the video image including the head video frame is deleted in accordance with the received request.

2. The apparatus according to claim 1, wherein the updating unit updates the recording time information by adding time of the deleted part of the video image expressed in year, month, day, hour, minute and second, to a value of the main time information when the part of the video image including the head video frame is deleted.

3. The apparatus according to claim 2, wherein the updating unit updates the recording time information by adding fraction time of deleted part of the video image that is less than one second, to a value of the error time information when the part of the video image including the head video frame is deleted.

4. The apparatus according to claim 3, wherein the error time information and the fraction time include time represented in video fields.

5. An apparatus for reproducing data from a recording medium comprising: video data; and management information including a recording time information indicative of date and time at which the video data is recorded, wherein the recording time information comprises a main time information including information of recording date and time of the video data represented by year, month, day, hour, minute and second, and an error time information including fraction time of the recording date and time of the video data that is less than one second, and wherein a video image represented by the video data comprises a plurality of video frames and wherein the recording time information indicates date and time at which a head video frame of the plurality of video frames is recorded, said apparatus comprising:

a calculation unit for calculating recording time of a frame to be displayed by adding elapsed time passed from the head video frame to a value of the recording time information of the video data during data reproducing operation; and a synthesizing unit for synthesizing the calculated recording time information and the video data.

6. A method for recording data onto a recording medium comprising: video data; and management information including a recording time information indicative of date and time at which the video data is recorded, wherein the recording time information comprises a main time information including information of recording date and time of the video data represented by year, month, day, minute and second, and an error time information including fraction time of the recording date and time of the video data that is less than one second, and wherein a video image represented by the video data comprises a plurality of video frames and wherein the recording time information indicates date and time at which a head video frame of the plurality of video frames is recorded, said method comprising:

receiving a request to delete a part of the video image from a user; and updating the recording time information when the part of the video image including the head video frame is deleted in accordance with the received request.

7. The method according to claim 6, wherein the recording time information is updated by adding time of the deleted part of the video image which is expressed in year, month, day, hour, minute and second, to a value of the main time information when the part of the video image including the head video frame is deleted.

8. The method according to claim 7, wherein the recording time information is updated by adding fraction time of the deleted part of the video image that is that is less than one second, to a value of the error time information when the part of the video image including the head video frame is deleted.

9. The method according to claim 8, wherein the error time information and the fraction time include time represented in video fields.

10. A method for reproducing data from a recording medium comprising: video data; and management information including a recording time information indicative of date and time at which the video data is recorded, wherein the recording time information comprises a main time information including information of recording date and time of the video data represented by year, month, day, hour, minute and second, and an error time information including fraction time of the recording date and time of the video data that is less than one second, and wherein a video image represented by the video data comprises a plurality of video frames and wherein the recording time information indicates date and time at which a head video frame of the plurality of video frames is recorded, said method comprising:

calculating recording time of a frame to be displayed by adding elapsed time passed from the head video frame to a value of the recording time information during data reproducing operation; and synthesizing the calculated recording time and the video data.

11. A system for recording data onto an optical disc comprising:

the optical disc including video data of a video image comprising a plurality of video frames and management information including a recording time information indicative of date and time at which a head video frame of the plurality of video frames is recorded, wherein the recording time information comprises a main time information including information of recording date and time of the head video frame represented by year, month, day, hour, minute and second, and an error time information including fraction time of the recording date and time of the head video frame that is less than one second, a receiving unit for receiving a request to delete a part of the video image from a user; and an updating unit for updating the recording time information when the part of the video image including the head video frame is deleted in accordance with the received request.

12. The system according to claim 11, wherein, when a plurality of successive frames including the head video frame are deleted, the updating unit changes a value of the main time information to a value of a first time information obtained by adding time of the deleted frames represented by year, month, day, hour, minute and second, to a value of the main time information, and changes a value of the error time information to a value of a second time information obtained by adding fraction time of the deleted frames less than one second to a value of the error time information.

13. The system according to claim 12, wherein, when the value of the second time information is equal to or more than one second, the updating unit updates the value of the main time information to a value of a third time information obtained by adding one second to a value of the first time information, and updates the value of the error time information to a value of a fourth time information obtained by subtracting one second from the second time information.

14. The system according to claim 11, wherein the error time information includes fraction time represented in video fields.

15. The system according to claim 11, wherein the error time information includes fraction time represented by a time stamp.

16. A system for reproducing data from an optical disc comprising:

the optical disc including video data of a video image comprising a plurality of video frames and management information including a recording time information indicative of date and time at which a head video frame of the plurality of video frames is recorded, wherein the recording time information comprises a main time information including information of recording date and time of the head video frame represented by year, month, day, hour, minute and second, and an error time information including fraction time of the recording date and time of the head video frame that is less than one second, a calculation unit for calculating recording time of a frame to be displayed by adding elapsed time passed from the head video frame to a value of the recording time information during data reproducing operation; and a synthesizing unit for synthesizing the calculated recording time and the video data.

* * * * *

UNITED STATES PATENT AND TRADEMARK OFFICE
CERTIFICATE OF CORRECTION

PATENT NO.    : 6,519,410 B1
DATED         : February 11, 2003
INVENTOR(S)   : Tomoyuki Okada et al.

It is certified that error appears in the above-identified patent and that said Letters Patent is hereby corrected as shown below:

<u>Title page,</u>
Item [56], References Cited, U.S. PATENT DOCUMENTS, please insert the following references: -- 6,147,949  11/2000  Yamagishi -- and
-- R.O.C.  10/2000  408311 --.

<u>Column 7,</u>
Line 13, change "VATR" to -- V_ATR --

<u>Column 12,</u>
Line 18, change "M-VOB_STI" to -- M_VOB_STI --.

<u>Column 13,</u>
Line 15, delete "Application Flag:".
Between lines 15 and 16, insert -- Application Flag: --.
Line 29, delete "fs:".
Between lines 29 and 30, insert -- fs: --.

<u>Column 14,</u>
Line 38, change "M-VOBI_SRP" to -- M_VOBI_SRP --.
Line 50, change "M VOB_GI" to -- M_VOB_GI --.

<u>Column 16,</u>
Line 8, change "M VOB#STI" to -- M_VOB_STI --.

<u>Column 18,</u>
Line 43, change "S VOB_STI" to -- S_VOB_STI --.

<u>Column 20,</u>
Line 67, change "PEGC" to -- PGC --.

UNITED STATES PATENT AND TRADEMARK OFFICE
CERTIFICATE OF CORRECTION

PATENT NO. : 6,519,410 B1
DATED : February 11, 2003
INVENTOR(S) : Tomoyuki Okada et al.

It is certified that error appears in the above-identified patent and that said Letters Patent is hereby corrected as shown below:

Column 21,
Line 26, change "Thumb: Nail" to -- Thumb Nail --.
Line 27, change "Thumb: nail" to -- Thumb nail --.

Signed and Sealed this

Fourteenth Day of October, 2003

JAMES E. ROGAN
*Director of the United States Patent and Trademark Office*